Oct. 8, 1963

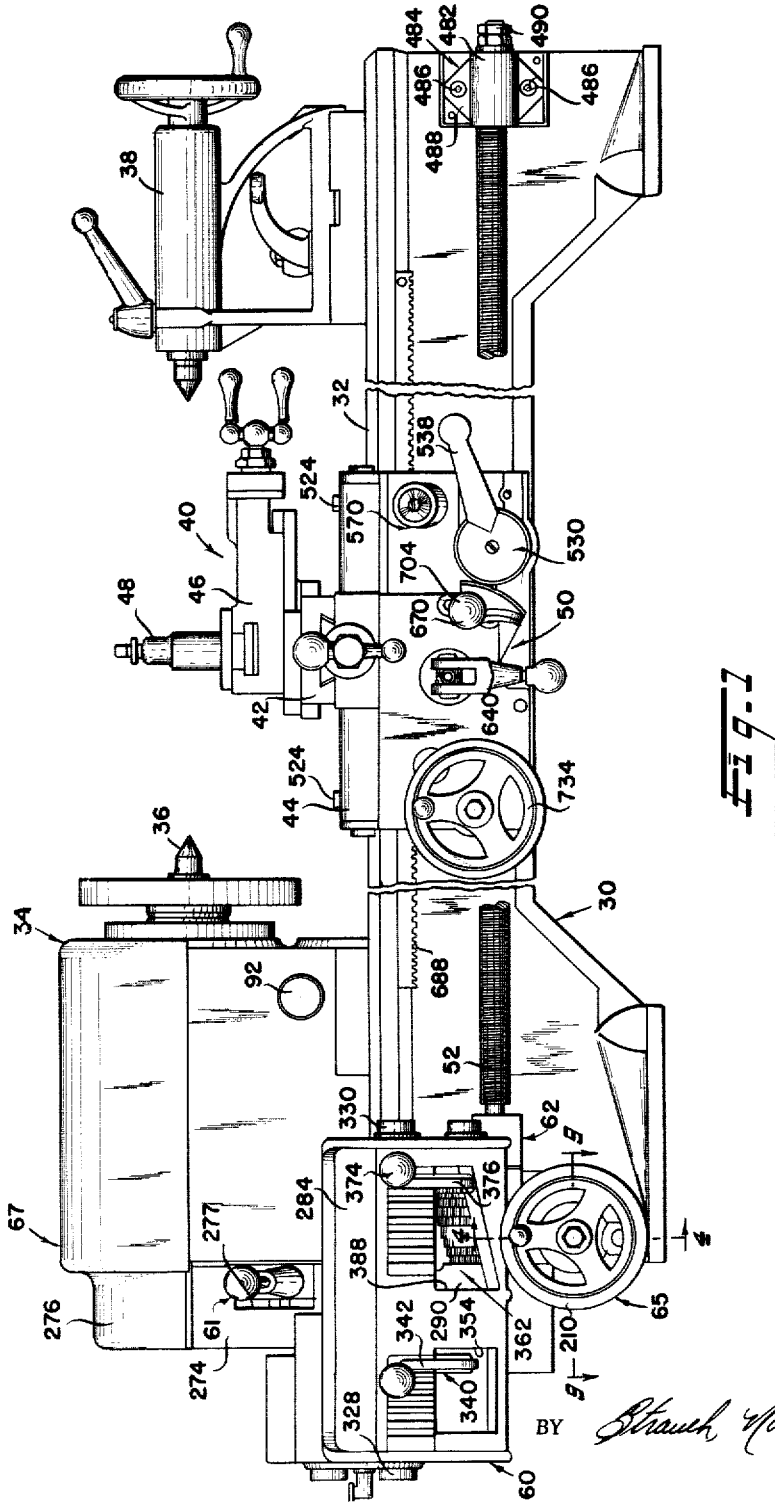

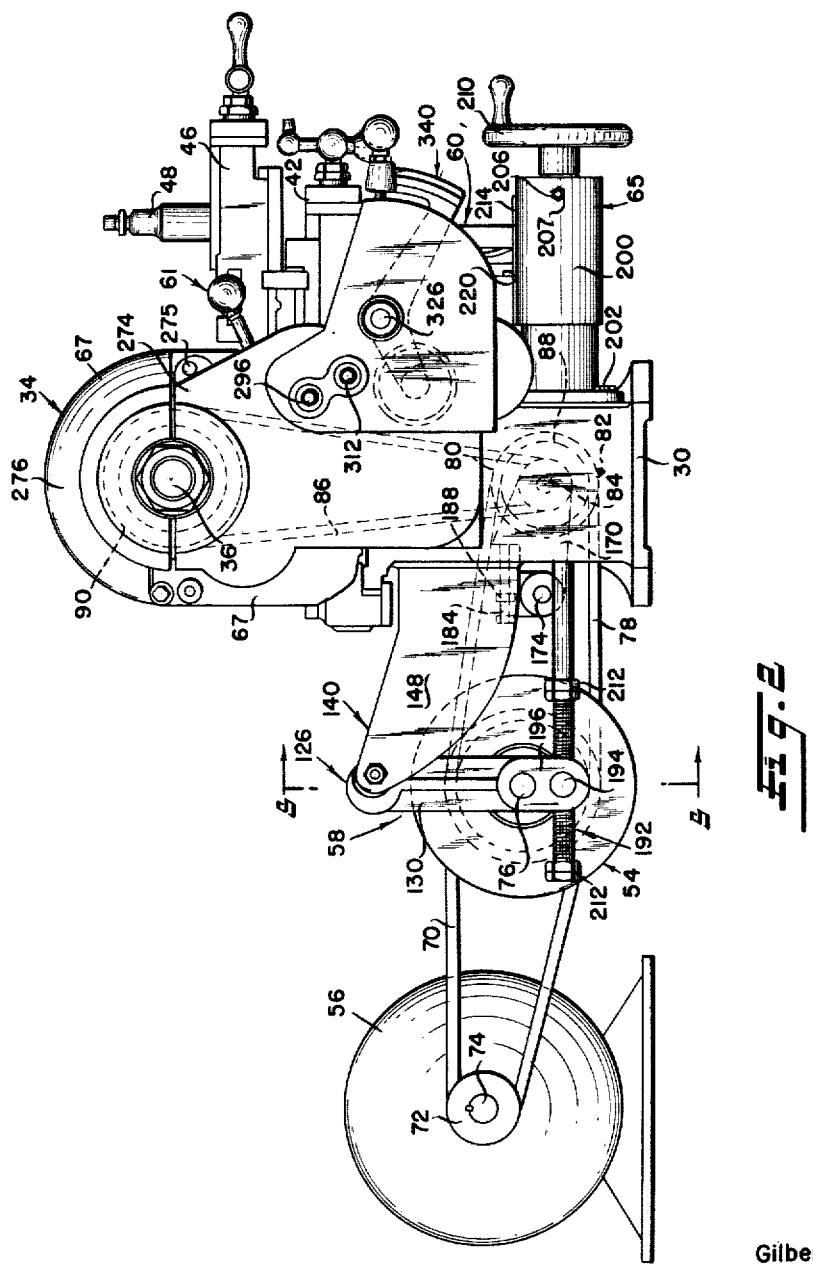

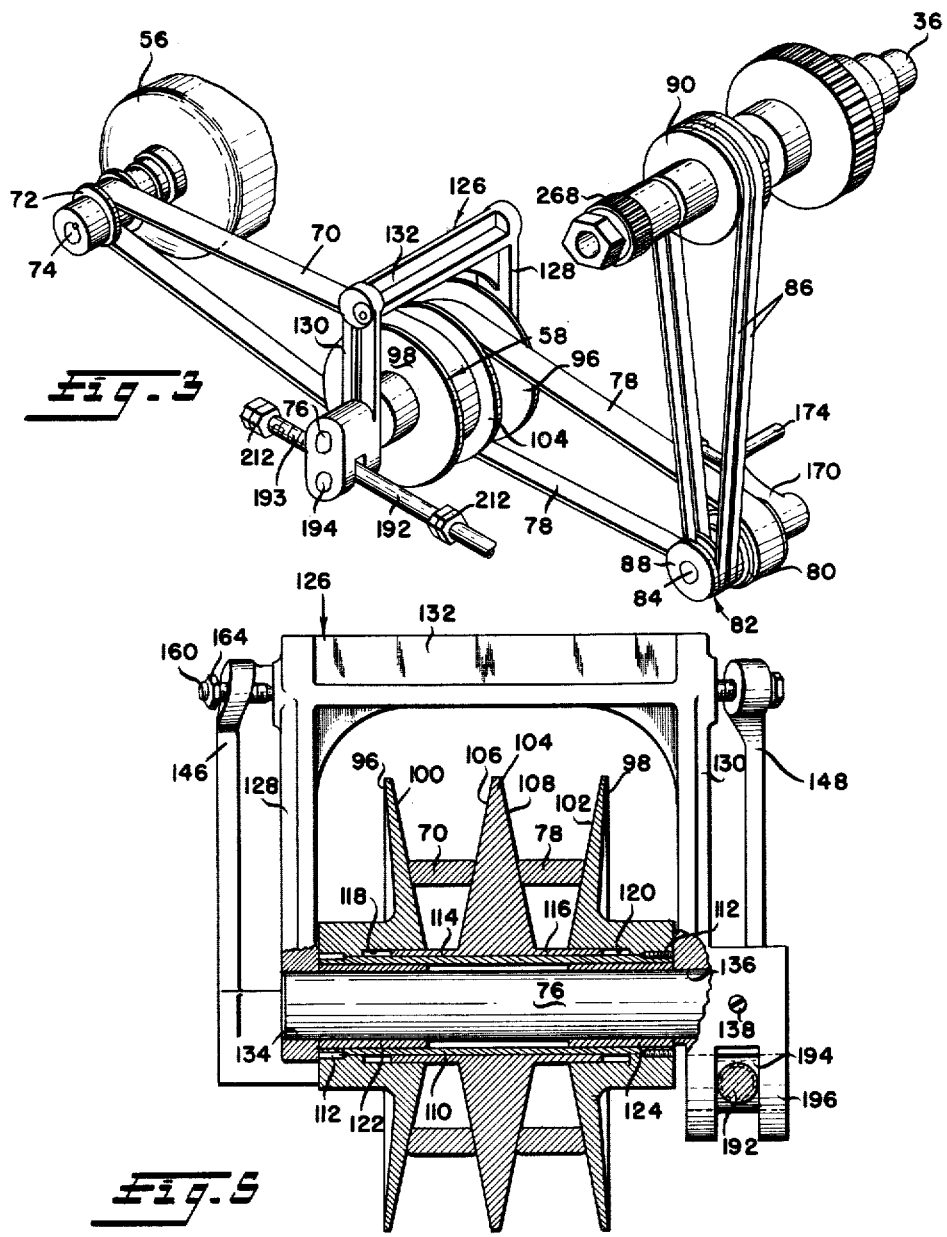

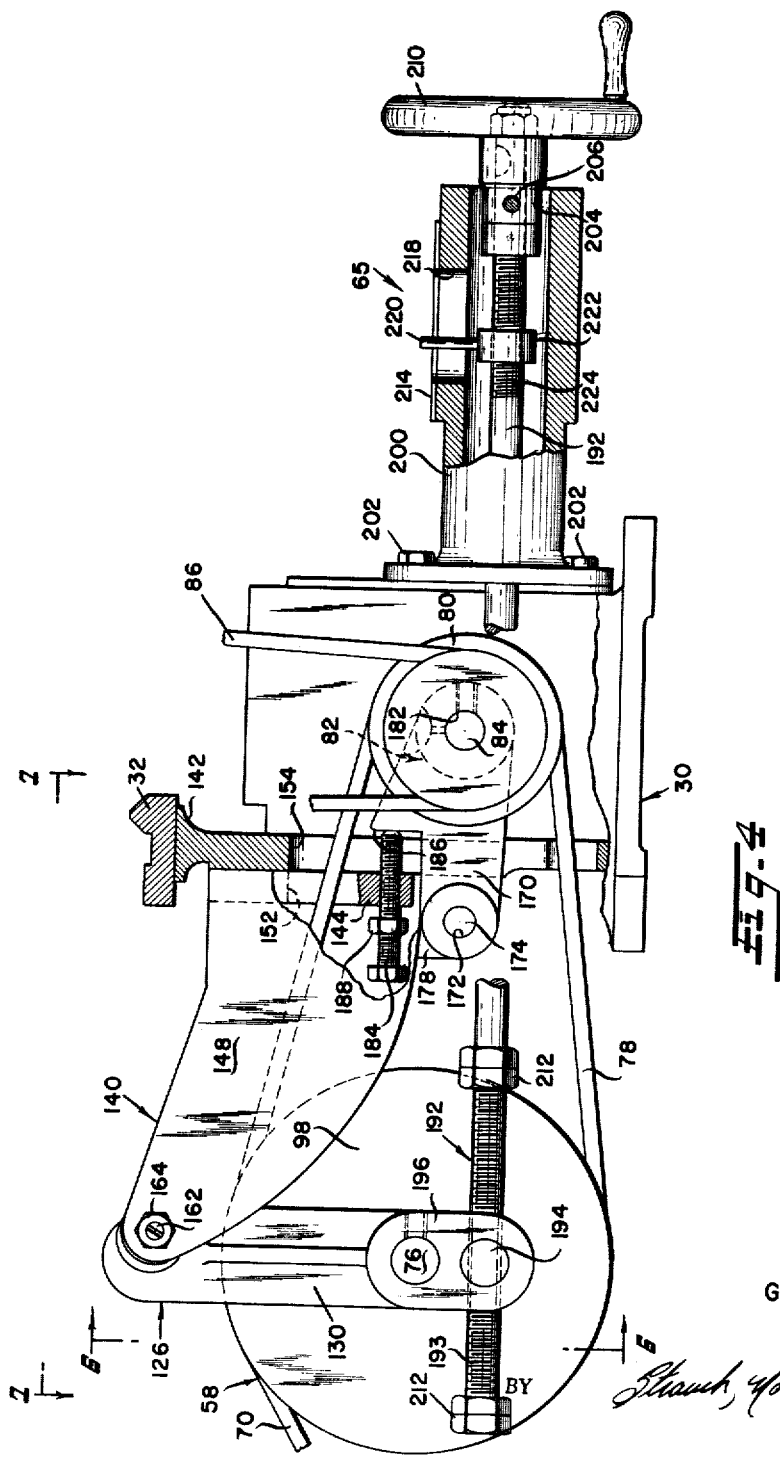

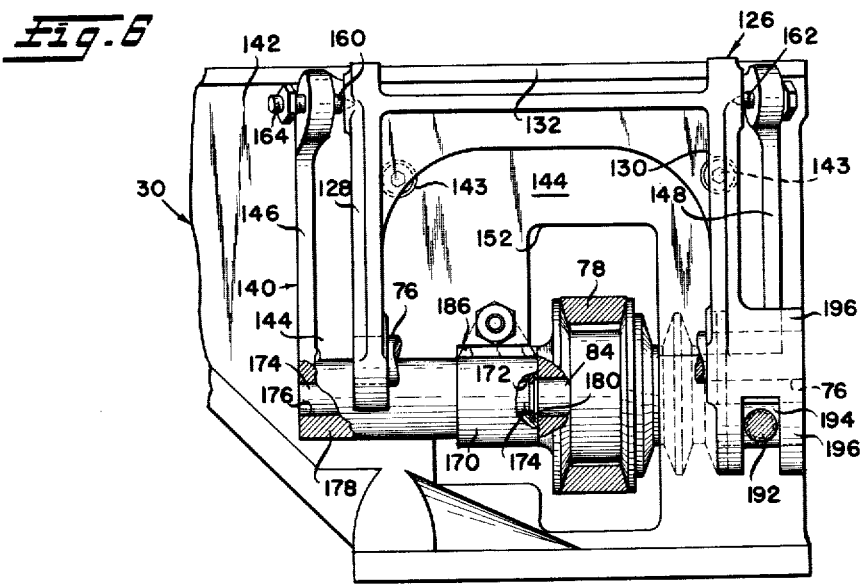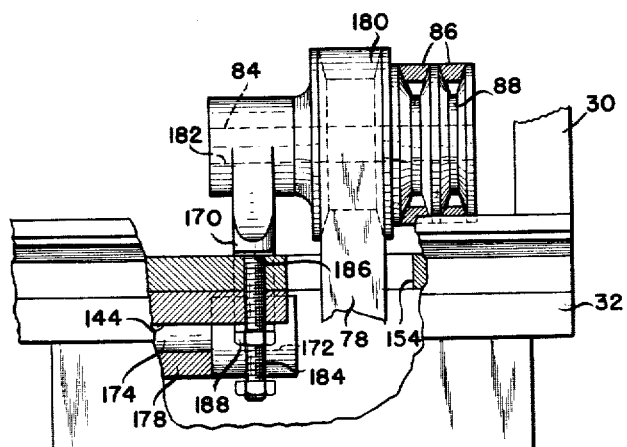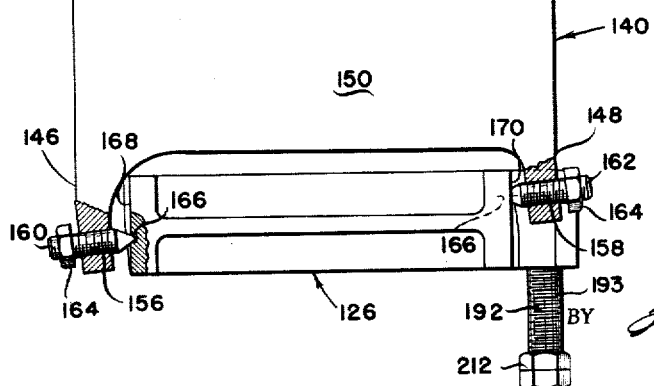

G. L. PIERCE 3,106,116

LATHE DRIVE TRAINS

Filed Feb. 29, 1960

INVENTOR
Gilbert L. Pierce

BY *Strauch Nolan & Neale*

ATTORNEYS

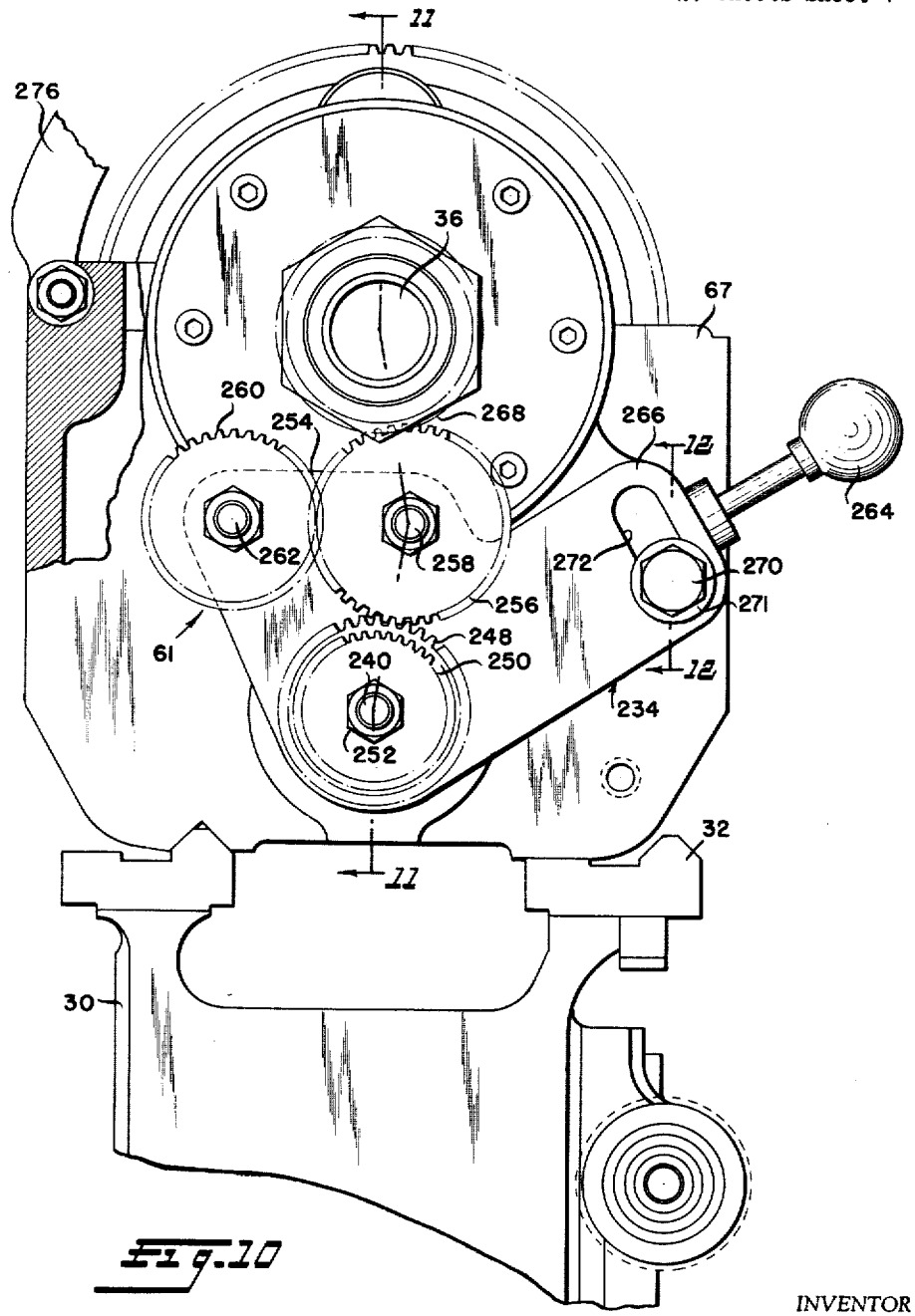

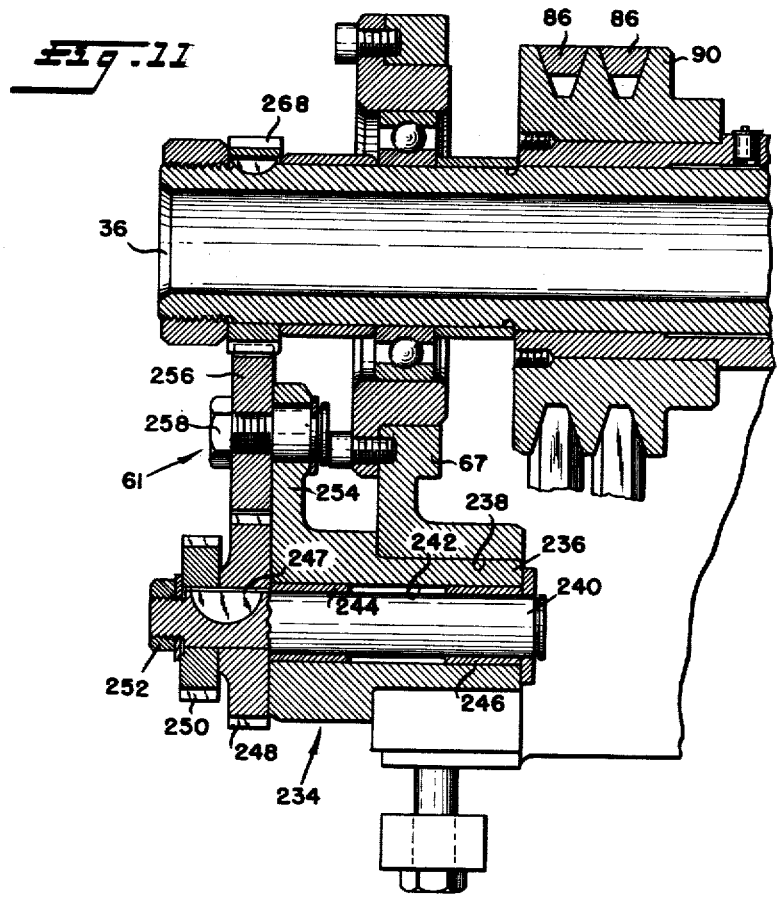
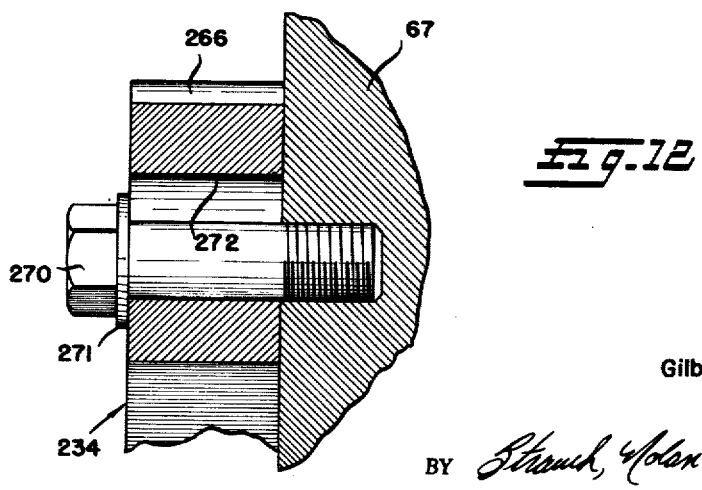

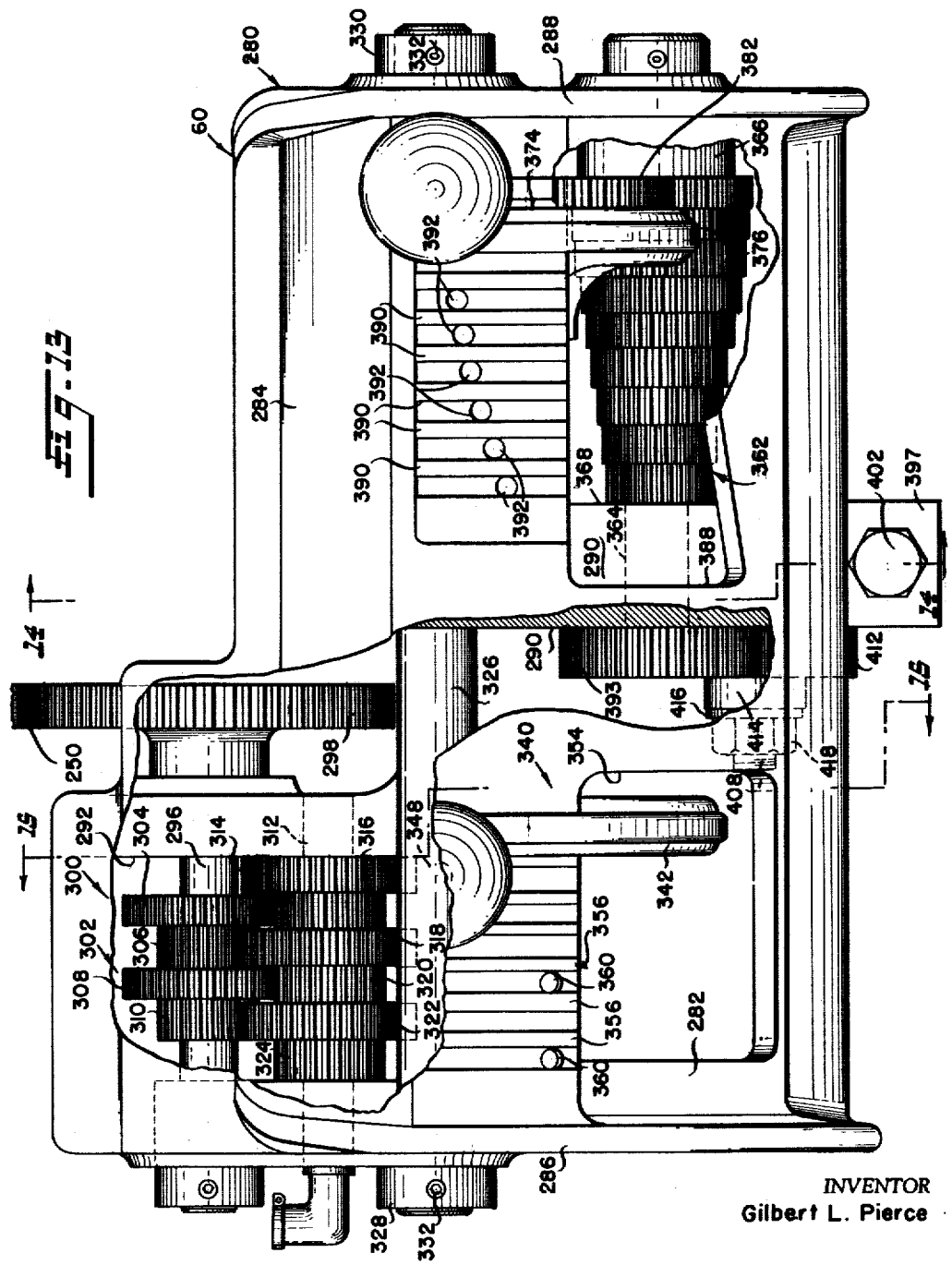

INVENTOR
Gilbert L. Pierce

BY Strauch, Nolan & Neale

ATTORNEYS

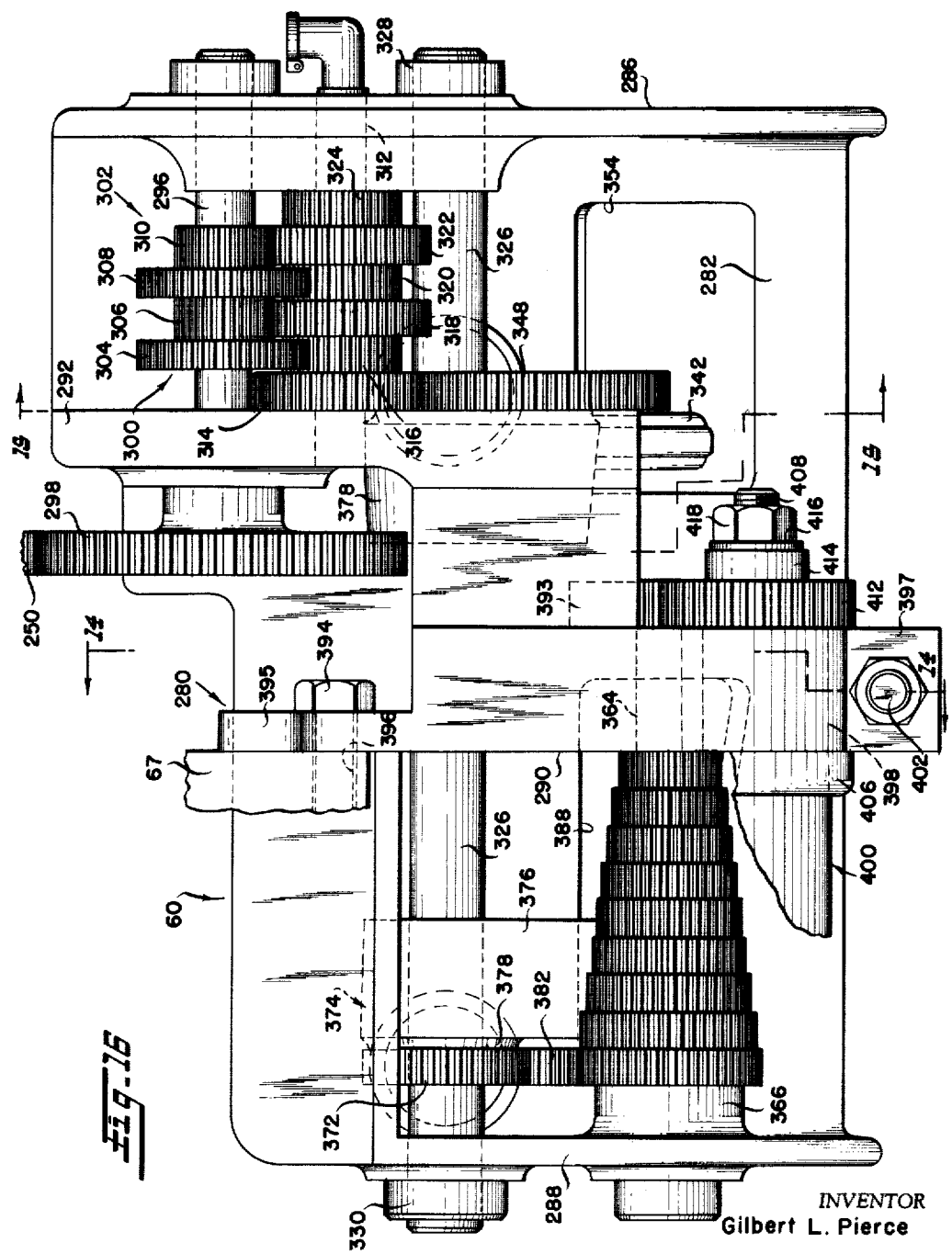

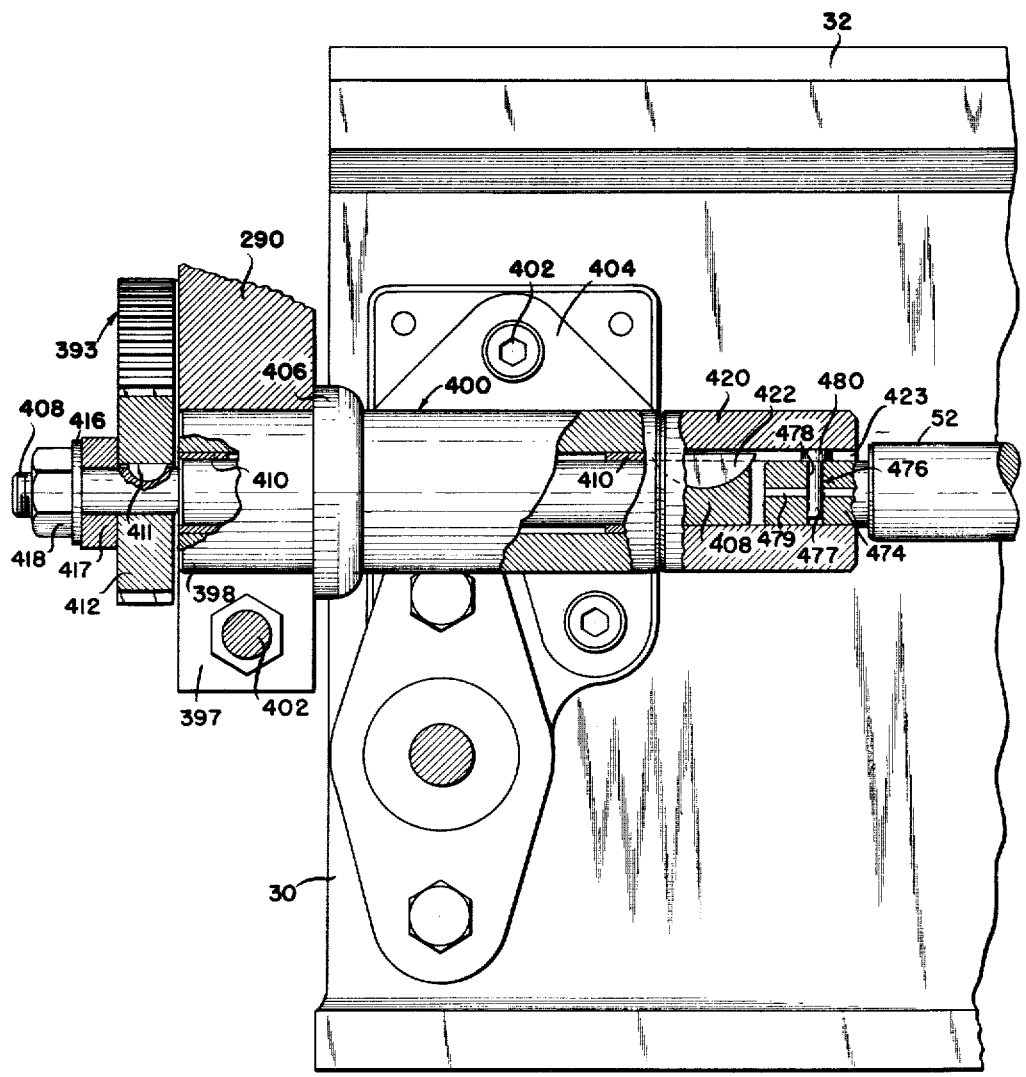

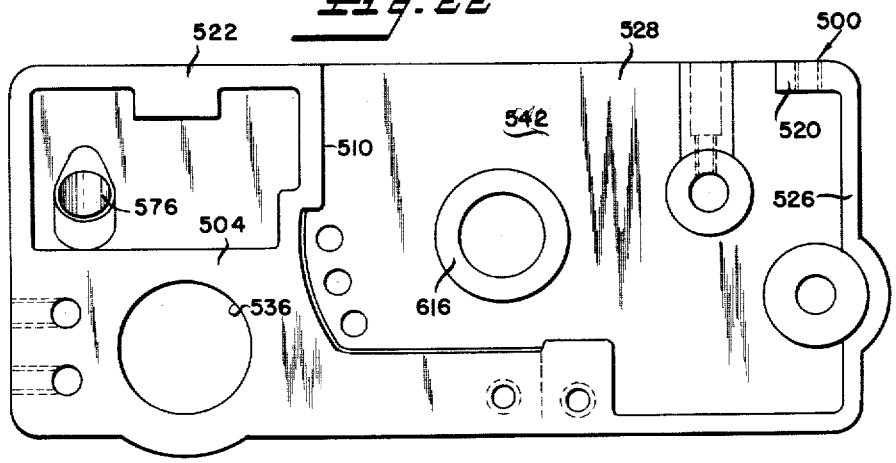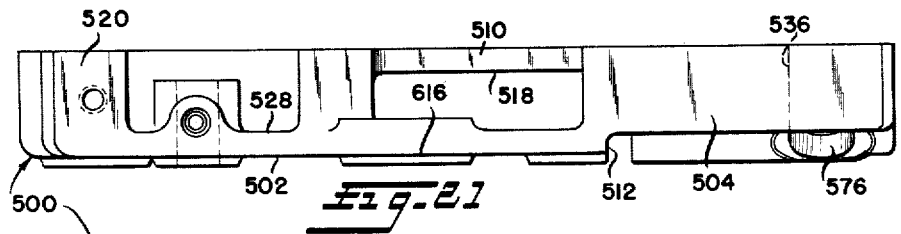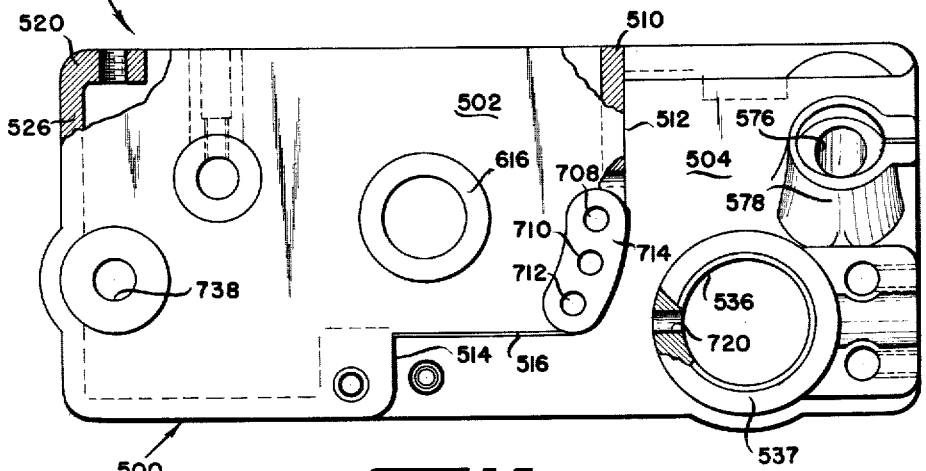

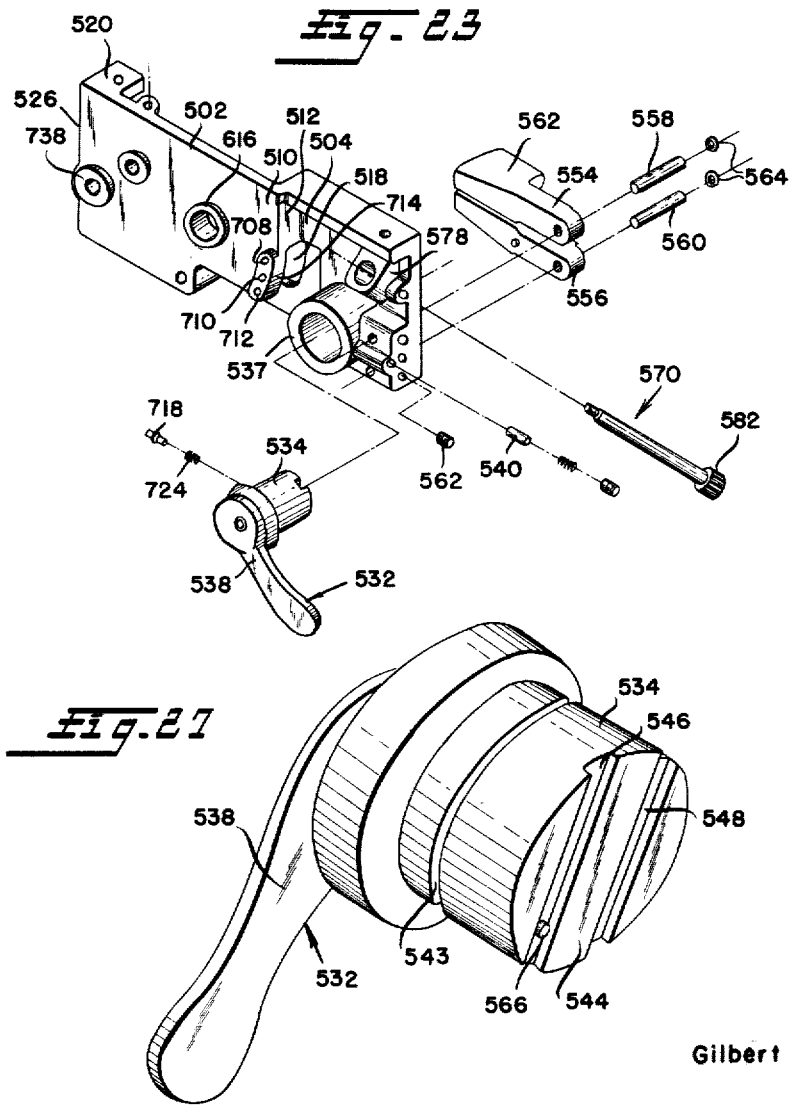

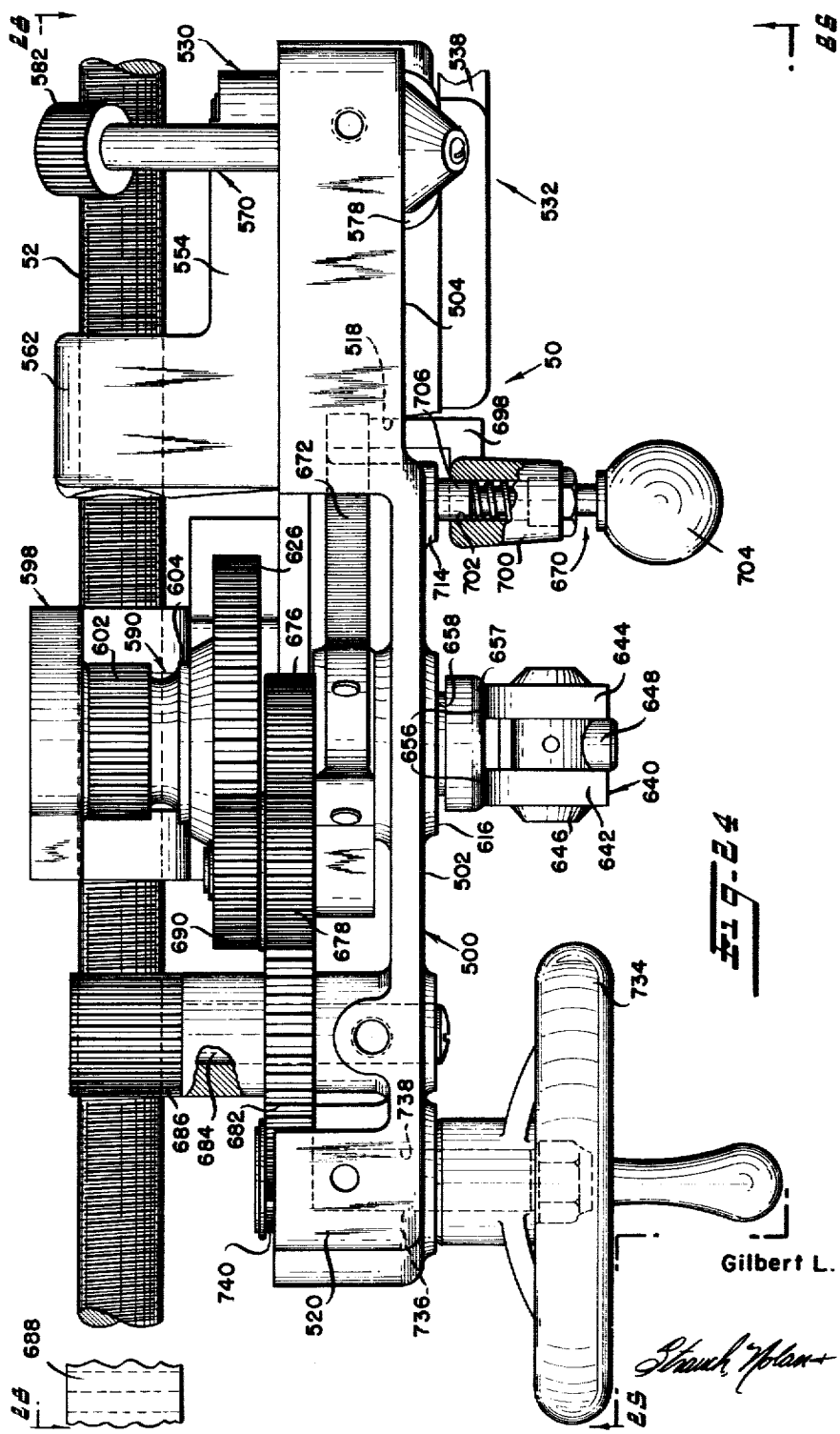

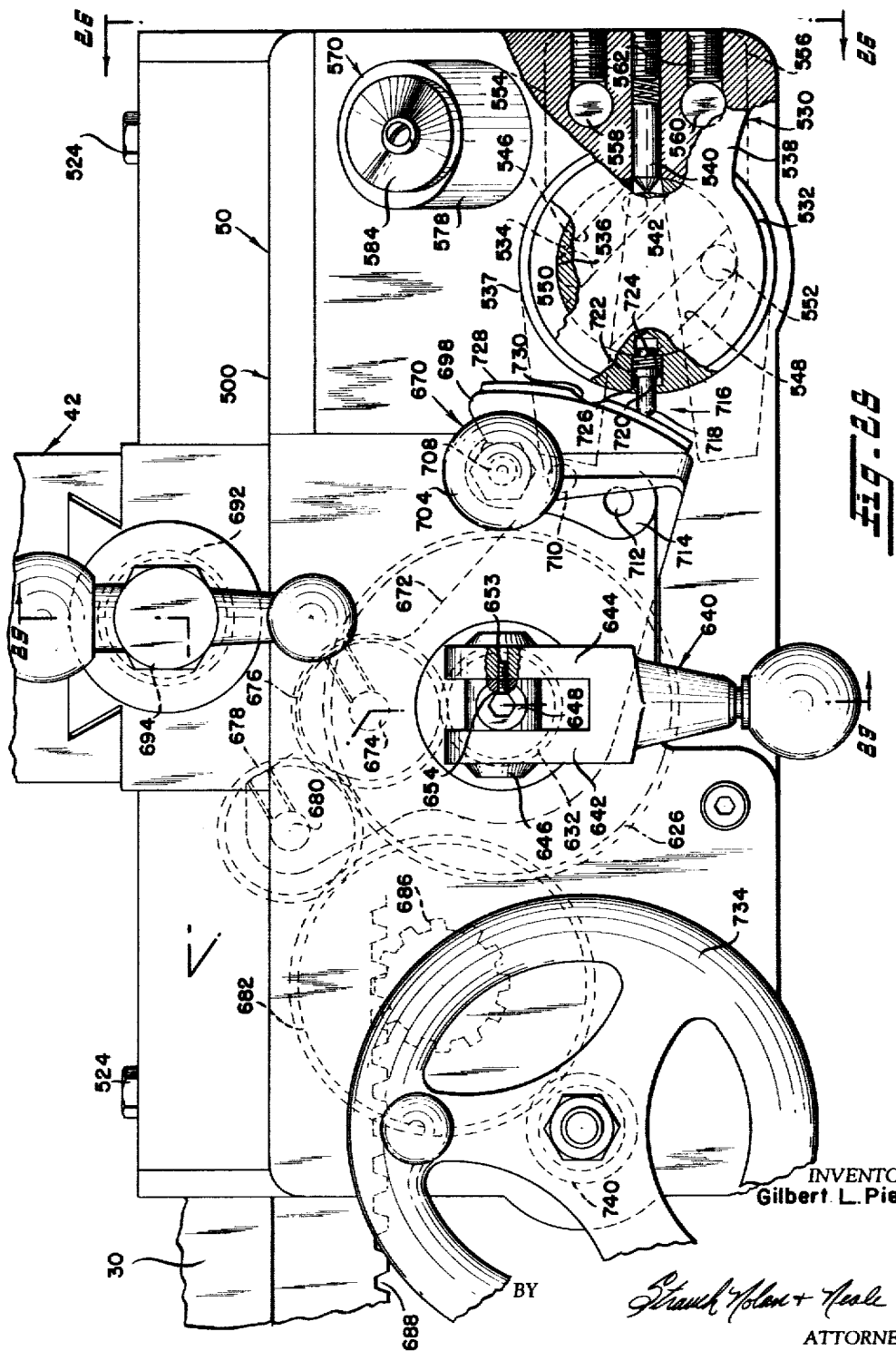

INVENTOR
Gilbert L. Pierce

ATTORNEYS

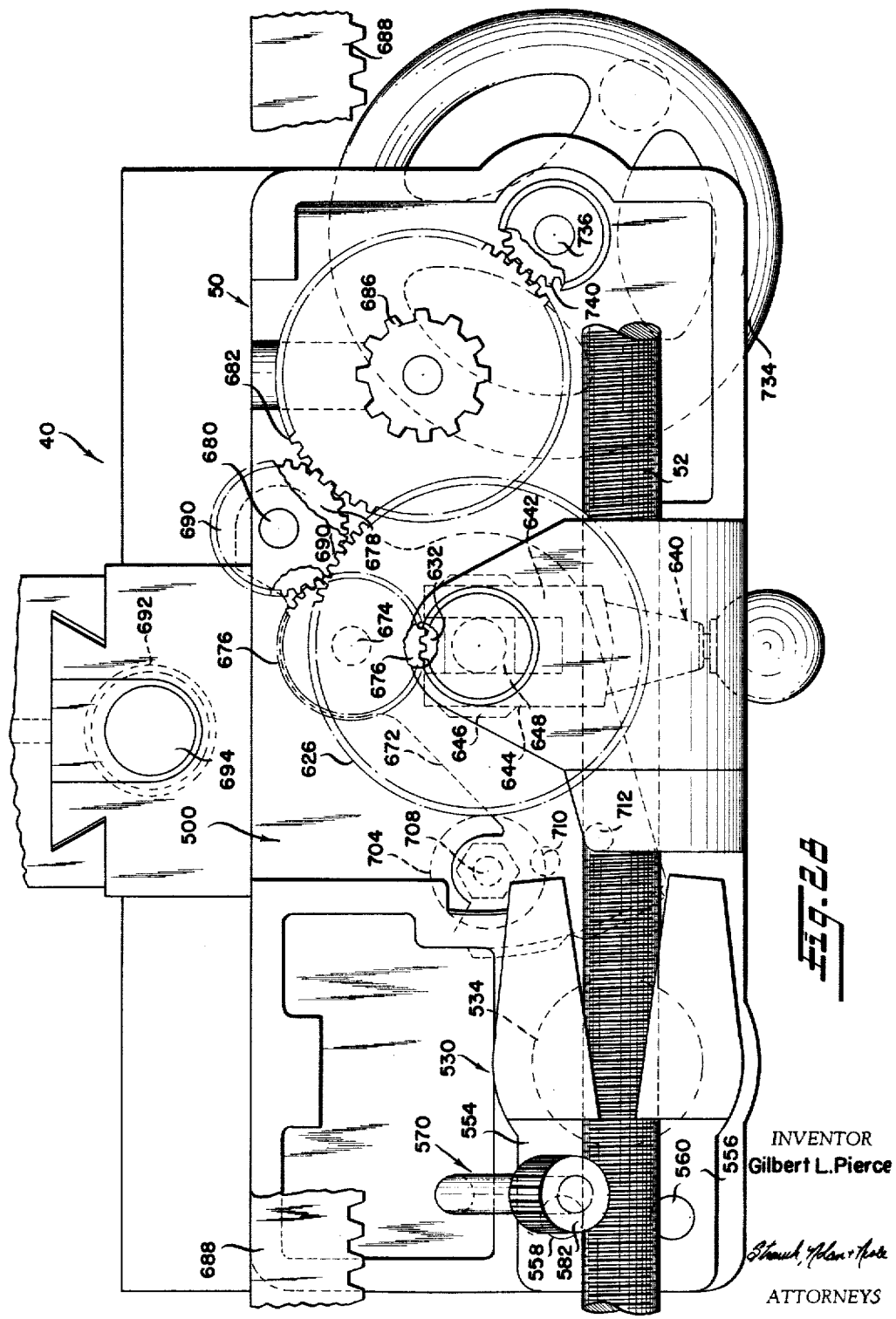

United States Patent Office 3,106,116
Patented Oct. 8, 1963

3,106,116
LATHE DRIVE TRAINS
Gilbert L. Pierce, Bellefontaine, Ohio, assignor to Rockwell Manufacturing Company, Pittsburgh, Pa., a corporation of Pennsylvania
Filed Feb. 29, 1960, Ser. No. 11,544
14 Claims. (Cl. 82—2)

The present invention relates to improvements in metal cutting machines and more particularly to improvements in the drive train of metal cutting lathes to assure a proper work piece speed-tool feed rate relationship.

With the introduction of high speed tools, fundamental changes have become necessary in the driving and speed control equipment for lathes and other machines of comparable types, and particularly in the speed controls for driving the work-piece carrying spindle and the carriage and cross feed mechanism of a lathe. As a result of the expanded use of lathes owing to the development of high speed tools, there is now a great necessity to provide for a wide range, infinitely variable head stock spindle speed together with a wide speed range of carriage and cross feeds readily variable within the range of each of the infinite speed variations available to drive the spindle.

The present invention accomplishes this end at minimum expense by co-ordination of the tool feed gearing and spindle speed to provide a predetermined series of major tool feed speed ratios when utilizing a conventional "pick-off" gear spider and to provide accurate continuous progressive controlled variations in the tool feed rate over the entire wide speed range of the spindle by utilization of a novel multi-speed gear box readily attachable as a replacement attachment for the conventional "pick-off" gear spinder. As a consequence, it is possible through this invention to provide a basic lathe structure which may be sold at a minimum price for use with a conventional "pick-off" gear spider or at a somewhat higher price with an alternate replacement multi-speed gear box to provide a continuous progressive tool feed rate throughout the variable speed range of the spindle so that ideal linear speeds may be maintained between the work and cutting tool to secure a final high finish metal removal during longitudinal or cross feed movement of the tool, and to approximate the ideal linear speeds between the work and the cutting tool during powered feed of the lathe cross slide for the same purpose.

It is, accordingly, the primary object of the present invention to provide a novel multi-speed metal cutting lathe wherein the tool feed rate and spindle speed are co-ordinated to efficiently assure a properly related work piece speed-tool feed rate relationship.

More specifically it is an object of this invention to accomplish this result by the provision of novel co-ordinated multi-speed selector type gear train for selectively establishing one of several available successively related speed ratio ranges between the output spindle of the lathe and the carriage driving feed screw whereby a selected peripheral work piece speed-tool feed rate relationship matched to the cutting rate of the material of the work piece is obtained.

Still another object of the present invention resides in the provision of a novel multi-speed metal cutting lathe having a head stock output spindle driven by a variable speed pulley drive at a selected one of an infinite number of speeds within a predetermined range and a multi-speed selector type gear train drivingly interconnecting the output spindle and the carriage feed screw of the lathe to impart a selected one of several available progressively variable fixed speed ratios of the spindle speed to the tool with the spindle speed independently of the variable speed pulley drive.

A further specific object of the present invention resides in the provision of a novel variable speed pulley drive that is unusually simple in construction and comparatively inexpensive to manufacture and is easily and rapidly adjusted to any of its infinite number of speeds within the range of adjustment to facilitate changes in the output speed of the driven pulley.

While for many years variations of the drive spindle speed of belt driven lathes and other machine tools has been effected through stop cone pulley arrangements and gearing, in recent years, efforts have ben directed toward the provision of a spindle drive train which permits accurate adjustment to any desired speed within a predetermined range. These efforts have been directed toward the incorporation of a variable speed V-belt type drive known as a variable speed pulley assembly in the spindle drive train. In V-belt type variable speed drive trains, if proper alignment of the input and output belts of the variable speed pulley assembly is to be maintained throughout the range of speed selection, it is necessary to impart axial displacement to the variable speed pulley assembly shaft concomitantly with the lateral displacement of the assembly that effects the speed variation. In variable speed pulley assemblies generally, various expedients have been devised for effecting this concomitant latral and axial displacement of the variable speed pulley assembly.

In metal and similar power tools, it is necessary to make relatively frequent adjustments of the spindle speed to accommodate differences in hardness of the work pieces, dulling of the cutting tools, particularly in metal working machines, and radial changes of the tool with respect to the work. As a consequence, it is highly desirable that the variable speed drive train in such machines not only be adapted for ready adjustment to minimize loss of time by the operators by assuring optimum cutting speeds but that it is capable of maintaining its adjusted speed ratio to minimize gouging of the work piece and tool damage that speed fluctuations often cause. With respect to the moderately priced variable speed pulley assembies heretofore proposed, the shifting mechanisms provided for effecting lateral and axial movements of the variable speed pulley assemblies necessary to effect speed changes and belt alignment have frequently been incapable of maintaining a selected speed ratio and proper belt alignment. This shortcoming of the prior devices has resulted in noisy operation because of periodic high frequency and uncontrolled axial movement of the pulley components, rapid wear of the drive belts due to such movements and alternate speeding up and slowing down of the lathe spindle causing work spoilage. As a consequence, the variable speed pulley assembly has not been heretofore widely accepted in the machine tool art by manufacturers who aim to produce high quality home workshop and low cost machine tools where simplicity and low manufacturing cost has its greatest appeal.

It is, accordingly, a further specific object of this invention to provide in a lathe or similar machine tool a variable speed pulley assembly type of drive train speed changer which retains the characteristic ease and quick adjustment features of such devices within a predetermined range and which is constructed so as to avoid speed fluctuations and substantial misalignment of the input and output belts of the variable speed pulley assembly throughout the designed range of speed adjustment.

More specifically, it is a further object of the present invention to provide in a lathe or similar machine tool, a variable speed pulley type of drive train speed changer which may be easily and quickly adjusted from the operating position in front of the lathe by manipulation of a non-overrunning positioning adjustment screw through which a desired speed can be selected and maintained without the use of a locking device and which is effective to impart controlled concomitant lateral and axial displacement to the variable speed pulley assembly during speed adjusting movement thereof and after adjustment, to maintain the selected speed without fluctuations and misalignments of the driving and driven belts.

Still another object of the present invention is to provide a variable speed pulley type of drive train speed changer wherein "chatter" characteristics inherent in many prior variable speed pulley drive assemblies are suppressed by positively and automatically lockingly fixing a corresponding axial position for the variable speed pulley assembly for each possible position of the pulley shaft as the distances between the motor pulley, the variable pulley assembly and the driven pulley are changed.

A further object is to provide in a lathe or similar machine, a variable speed pulley assembly type of drive train speed changer that is adjustable while the lathe is running.

Still a further object of the present invention is to provide a variable speed pulley assembly drive of this type with a speed-selector indicator of improved and simplified construction that cooperates with and is conveniently located adjacent to the mechanism for adjusting the position of the variable speed pulley assembly to provide effective direct dial readings for permitting pulley speed selection to be made with a minimum of effort upon the part of the operator of the lathe.

Still another object of the present invention is to provide in a lathe or similar machine a variable pulley type of drive train speed changer having a fixedly mounted support bracket which supports a variable speed pulley and shaft assembly suspended from spaced pivots on the support bracket about an axis laterally inclined with respect to the axes of the drive and driven pulleys and having its variable speed pulley and shaft axis generally longitudinally related to the driving and driven pulleys and an inherently resilient pivotally mounted adjustment screw operable to rotate the variable speed pulley assembly in a laterally arcing path so that the adjustment screw is bent laterally with respect to its own axis to frictionally bind its thread connection with the variable speed pulley assembly and thereby automatically lock the variable speed pulley assembly in its adjusted position.

In accordance with the present invention, selected fixed ratios of the infinite speeds transmitted by the variable speed pulley drive train, are imparted to the feed screw by means of a special multi-speed gear train assembly so that the proper tool feed-work piece speed ratios are obtained.

Accordingly, a further specific object of this invention resides in the provision of a novel multi-speed gear selector type gear train operable to selectively establish one of several available speed ratios between the output spindle of the lathe and the carriage driving feed screw and which is of unique construction to provide for ease of operation upon the part of the operator, simple in construction, compact in design, and provides for an exceptionally wide range of reduction gear train ratios.

Still another object of the present invention resides in the provision of a novel multi-speed gear selector type gear train assembly having an exceptionally unique arrangement for promoting easy and convenient selection of tumbler gear positions and for securingly holding the tumbler gears in selected position.

Another object of the present invention is to provide a novel multi-gear selector type gear train assembly wherein a single tumbler gear shaft extends from opposite sides of a centered gear box partition wall with its axis between a cone gear assembly at one side of the partition and a series of intermeshed dual gear sets at the other side of the partition and having respective tumbler levers at opposite sides of the partition to selectively engage the various gears at the respective sides of the partition.

Still another object of the present invention is to provide in a metal cutting lathe, a novel feed and reverse mechanism of simplified construction drivingly interposed in the drive train between the lathe headstock drive gear and the feed screw drive gear and having a simple shiftable gear supporting reversing lever which can be manipulated from an operating position in front of the lathe.

A further specific object of this invention is to provide a quick change multi-speed selector type gear box assembly that is in the form of an attachment unit and is capable of being readily and quickly removably mounted in operating position on the lathe.

In the past, it has been the custom of moderately fixed buyers in setting up machine tool workshops to purchase lathes equipped with conventional "pick-off" gear spiders instead of more expensive lathes that come equipped with multi-speed gear boxes to thereby help keep the initial cost at a minimum. After the buyer has obtained other elemental machine tools necessary to outfit his workshop and has developed his ability to efficiently operate the equipment he then usually turns to the task of improving the equipment that he already has so as to correspondingly improve on the quality of his workmanship. To this end, an essential element necessary to improve the quality of work produced by lathes equipped with "pick-off" gear spiders, calls for the replacement of the "pick-off" gear spider with a selector-type multi-speed gear box. With prior art lathes, such a replacement requires extensive modification of the lathe in order to mount the multi-speed gear box. In addition to drilling holes in the lathe bed for the multi-speed gear box mounting screws, further connector gearing is customarily required to drive connect the spindle output gear and the gear box input gear and an alternate feed screw of shorter length is generally needed to replace the original feed screw. Consequently, such a modification constitutes a high inordinate expense to the owner, often precluding him from such an undertaking.

Also, in some cases, it is preferable for certain work operations to utilize a standard "pick-off" gear spider instead of the more complicated multi-speed gear box. In lathes that come factory-equipped with a multi-speed gear box, the problems and costs in mounting a "pick-off" spider gear assembly in place of the gear box are substantially the same as above discussed and the modification is costly and time consuming. Moreover, even after the necessary modifications are made to the lathe to facilitate replacement of either the gear box or the "pick-off" spider, the interchangeability of these two units cannot be readily accomplished. To this end, it will be appreciated that if it is desired to replace the "pick-off" spider with the gear box it is necessary to remove the spider, to replace the feed screw, to mount the additional connector gears in addition to the cumbersome task of mounting the gear box which normally has at least four mounting screws. In mounting and connecting up all of these components parts, it will be appreciated that extensive time and labor is consumed and it is apparent that with prior art lathes, a "pick-off" spider gear assembly cannot be readily and easily interchanged with a multi-speed gear box.

Accordingly, it is a further specific object of the present invention to provide a novel metal cutting lathe wherein a conventional "pick-off" gear spider assembly drivingly connecting the carriage feed screw with a power source is readily and quickly interchangeable with a multi-speed selector type drive gear box without necessitating the change or modification in any other component part of the lathe.

Still further, it is the object of the present invention to accomplish this result by the provision of the multi-speed gear box in the preceding object wherein the multi-speed gear drive box has a self-contained input gear engageable with the lathe spindle gear box output gear so as to obviate the need for the installation of independent connector gears.

More specifically, it is a further object of this invention to provide in a lathe a novel multi-speed selector type drive gear box that is in the form of an attachment unit and is capable of being readily and quickly removably mounted on a fixed support bracket that normally accommodates the mounting of a conventional "pick-off" spider gear assembly.

In accordance with this present invention, the immediate foregoing objects are accomplished by providing a permanently fixed mounting bracket which serves as a mount for either a multi-speed drive gear box or a conventional "pick-off" spider gear assembly wherein the casing of the gear box has an integral split mounting collar corresponding to the split mounting collar of the "pick-off" spider gear assembly.

It is, accordingly, a further specific object of the present invention to provide a novel multi-speed gear box wherein the casing is provided with a split mounting collar that corresponds to the split mounting collar of a standard "pick-off" spider gear assembly.

A further object of the present invention resides in the provision of a novel multi-speed drive box according to the preceding object wherein the casing is formed with a central rib-like structurally reinforcing partition wall from which the split mounting collar integrally depends to ensure a rigidly mounted gear box that is free from vibrational or other movement.

In accordance with the present invention, a further specific object of the invention is to provide in a lathe, a permanently fixed mounting bracket for interchangeable mounting either a conventional "pick-off" spider gear assembly or a multi-speed selecter type gear box and which also serves to provide a support for journalling the headstock end of the carriage feed screw.

Still a further specific object of the present invention resides in the provision of a permanently fixed mounting bracket according to the preceding object wherein the mounting bracket provides support for a shear-pin connection between the output of the feed screw gear train and the feed screw to prevent excessive torsional loads on the feed screw from damaging the lathe apron parts or the more fragile and highly loaded multi-speed drive box gear train.

According to the present invention, the preceding object is accomplished by journalling in the permanently fixed mounting bracket a stub drive shaft which supports a drive gear meshing with the output gear of either the multi-speed gear box or the conventional "pick-off" spider gear assembly and which is keyed to a longitudinally keywayed coupling collar which receives the headstock end of the feed screw so that the exposed head end of a shear pin extending transversely through the journalled end of the feed screw is received in the longitudinal keyway of the coupling to thereby establish a freely axially slidable shear pin connection between the journalled stub drive shaft and the feed screw. By this structure, it will be appreciated that in order to replace the shear pin, the feed screw is simply axially shifted away from the coupling collar until the shear pin is exposed.

Accordingly, it is a further specific object of this invention to provide a feed screw coupling collar having a keyway adapted to axially receive the head of a shear pin whereby the feed screw may be readily slid axially to facilitate ready replacement of the shear pin.

In order to support the feed screw, according to the present invention, when it is axially slid out of the coupling collar to permit replacement of the shear pin, the lathe apron is provided with a half-nut mounting operator operable to engage the feed screw and thereby support the feed screw from the apron.

Accordingly, a further specific object of the present invention is to provide in a lathe apron structure, a novel half-nut mounting and operator that is simple in construction, rugged, and easy to manufacture.

More specifically it is an object of the present invention to provide in a lathe apron structure, a novel half-nut mounting and operator wherein the half-nut elements are pivotally secured to rearwardly projecting pins fixed on the apron back.

Another specific object of the present invention is to provide in a lathe apron structure, a novel half-nut mounting and operator having a simple one-piece rugged operating level held in place in an apron journal opening by means of a spring loaded retaining pin mounted in the apron and cooperating with an annular groove in a stud type journal hub forming part of the operating lever.

Still another specific object of the present invention is to provide in a lathe apron structure, a novel half-nut mounting and operator comprising opposed pivotally mounted half nut elements wherein forwardly projecting pins are permanently fixed one to each half nut element and are received in separate equidistant chordal grooves formed in the inner end face of a lever operated stud type hub journalled in the apron wall.

Another specific object of the present invention is to provide in a lathe apron structure, a novel carriage feed interlock between the feed shift lever of a carriage feed shift mechanism and the control lever of a direct feed screw engaging half-nut mounting so that the half-nut control lever is permitted to turn freely only when the feed shift is in neutral or transmission carriage drive disconnect position and wherein the feed shift lever has a bridge portion disposed and formed to function as part of the interlock.

A further specific object of the present invention resides in the provision of a lathe carriage feed interlock mechanism for permitting direct engagement of the lathe feed screw by a half-nut assembly only when the carriage feed shift lever is in neutral position wherein a pin is carried by a journal boss of the half-nut control lever and is spring biased radially outwardly of its receiving recess only when aligned with a notch peripherally formed in a cam surface of the carriage feed shift lever.

Still another object of the present invention resides in the provision of a simplified carriage feed gear drive and a cross feed gear drive which are selectively drivingly coupled to the power transmission gearing of the lathe by means of a feed shifter lever.

A further specific object of the present invention is to provide in a lathe, an apron for mounting the carriage feed mechanism and the cross feed mechanism wherein the apron is capable of being constructed from a one-piece casting and is capable of carrying a one-piece carriage feed shift lever.

The one piece construction of the apron frame thus provided for, may be produced much more cheaply and readily than the built-up multi-piece apron frames heretofore used, since, of course, the machining of interfitting frame parts is dispensed with and a single casting operation only is required to produce the entire apron frame which may then be machined as a whole, and have its several bearing holes and passages trued out easily and quickly. Further such a one piece apron frame is advantageous from the standpoint of strength and rigidity as will be readily understood. The construction and arrangement of gearing in the apron as will be described permits a flexible and readily shiftable drive connection from the feed screw so that the apron may be fed lengthwise in either direction, or the cross slide may be fed crosswise by a gear drive and clutch connection from the feed screw, or the feed screw may be employed to feed the apron directly for screw cutting and like uses through the half-nut and operator, the interposed safety interlock between the carriage feed shift lever and the half-nut operator insuring that only one of the feed mechanisms for the apron can be operatively connected at a given time.

Accordingly, another specific object of the present invention resides in the provision of a one-piece lathe carriage apron that is simple in construction, easy to remove and that accommodates the mounting of a carriage feed shift lever on the back so that it is manipulatable from the front.

More specifically, it is object of the present invention to provide for a one-piece lathe apron having nonoverlapping front wall portions relatively forwardly and rearwardly offset to one another and having an end facing aperture providing substantially straight line communication between the rear face of one wall and the front face of the other wall whereby a one-piece carriage feed shift lever is capable of being swingably mounted at a position behind one wall portion so as to extend through the aperture and in front of the rearwardly offset wall to facilitate manipulation thereof.

Another specific object of the present invention resides in the provision of a novel inclined threading indicator assembly adapted to be mounted on a lathe apron and while is simple in construction and easy to manufacture.

Further objects of the invention will appear as the description proceeds in connection with the appended claims and the annexed drawings wherein:

FIGURE 1 is a front elevational view showing a metal cutting lathe according to a preferred embodiment of the present invention;

FIGURE 2 is a left hand or head stock end elevation of the lathe shown in FIGURE 1;

FIGURE 3 is a perspective view illustrating the variable speed head stock spindle drive train shown in FIGURE 2;

FIGURE 4 is an enlarged fragmentary sectional view taken along line 4—4 of FIGURE 1 and illustrating the variable speed drive train shown in FIGURE 2;

FIGURE 5 is an enlarged sectional view taken along line 5—5 of FIGURE 2 and illustrating the details of the variable speed pulley assembly and the pivoted mounting bracket therefor;

FIGURE 6 is a fragmentary sectional view taken along the line 6—6 of FIGURE 4 illustrating the pivoted mounting bracket with the variable speed pulley removed;

FIGURE 7 is a partially sectioned top plan view taken along line 7—7 of FIGURE 4;

FIGURE 10 is an enlarged left-hand or head stock end partially sectioned elevational view of the lathe shown in FIGURE 1 with cover plates removed and illustrating interior details of the feed stop and reverse mechanism for the carriage feed screw;

FIGURE 11 is a section taken substantially along line 11—11 of FIGURE 10;

FIGURE 12 is a section taken along line 12—12 of FIGURE 10;

FIGURE 13 is a front elevational view of the quick change gear box transmission and support bracket shown in FIGURE 1 with the housing partially broken away to show interior details;

FIGURE 15 is a sectional view taken along line 15—15 of FIGURE 13;

FIGURE 16 is a rear elevational view of the quick change gear box transmission and supporting bracket shown in FIGURE 13;

FIGURE 20 is an enlarged front elevational view of the apron shown in FIGURE 1;

FIGURE 21 is a top plan view of the apron shown in FIGURE 20;

FIGURE 22 is a rear elevational view of the apron shown in FIGURE 20;

FIGURE 23 is an exploded perspective view of the apron shown in FIGURE 20 and the half-nut mechanism for longitudinally driving the carriage of the lathe shown in FIGURE 1;

FIGURE 24 is an enlarged top plan view partially in section and illustrating the carriage apron structure of the lathe shown in FIGURE 1;

FIGURE 25 is a front elevational view taken along lines 25—25 of FIGURE 24 with the apron partially broken away to show interior details of the carriage;

FIGURE 27 is an enlarged perspective view of the half-nut control lever for the half nut mechanism illustrated in FIGURE 25;

FIGURE 29 is a section along lines 29—29 of FIGURE 25.

GENERAL

Figure 8:
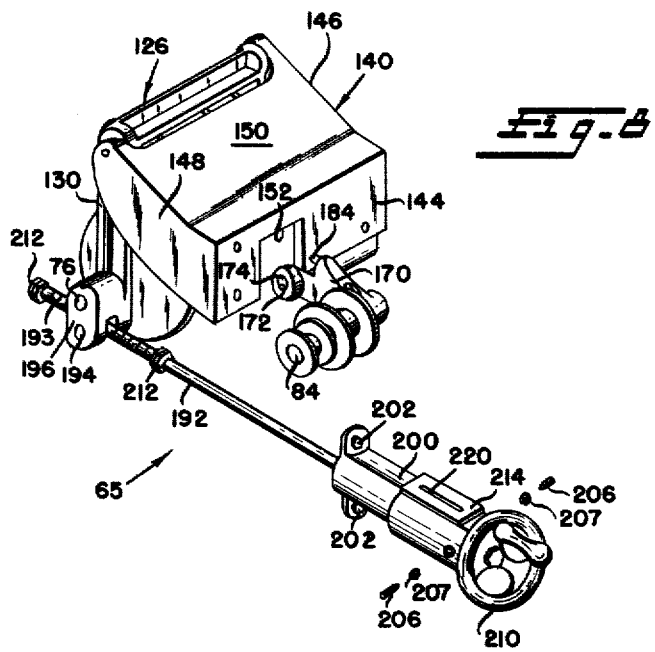
FIGURE 8 is a perspective view of the variable speed pulley assembly as mounted in its fixed support bracket.

Referring now to the drawings and more particularly to FIGURES 1 and 2, the principal components of the lathe assembly there shown are the lathe bed 30 adapted to be fixedly mounted on a bench or frame (not shown) and having longitudinal ways 32, a lathe head stock 34 mounted at one end of the lathe bed and including a head stock spindle 36 adapted to mount a workpiece (not shown), a tail stock 38 of conventional construction mounted at the opposite end of the lathe bed in the usual manner, and a tool carriage 40 slidably supported on longitudinal ways 32 of lathe bed 30. Tool carriage 40 includes a cross slide 42 slidably mounted on a saddle 44 for transverse cross feed movement, a compound rest 46 mounted on cross slide 42 in the usual manner, a tool post 48 conventionally mounted on compound rest 46 and adapted to hold a tool (not shown) for working engagement with the workpiece held by spindle 36, and an apron structure 50 extending downwardly from carriage 40 in front of lathe bed 30 and which includes the longitudinal and cross feed drives for powering carriage 40. Driving power to the apron longitudinal and cross feed drives is transmitted through a lead screw 52.

Driving power for headstock spindle 36 and lead screw 52 is provided for by a multi-speed drive train 54 (FIGURE 2) made up of a single speed electric motor 56 of conventional construction, an infinitely variable speed pulley drive assembly 58 operative to drivingly connect motor 56 to spindle 36 at selectively variable speeds, and a quick change speed gear box transmission unit 60 in the form of an attachment unit drivingly connected to lead screw 52 through a special mounting bracket and shearing pin assembly 62 (FIGURE 1) to establish one of several available speed ratios between spindle 36 and feed screw 52, and a stop and reverse feed mechanism 61 drivingly connecting spindle 36 to the input of gear box unit 60 for stopping and reversing the feed to carriage 40. The mounting bracket and shearing pin assembly 62 removably mount gear box unit 60 and one end of feed screw 52 and facilitates ready interchangeable replacement of gear box unit 60 with a pick off gear spider assembly 64 (FIGURE 19a) of conventional construction. In order to selectively control the speed setting of variable speed pulley drive assembly 58, a special self-locking speed control unit 65 is provided and includes a scale and pointer assembly positioned to be readily viewable by the lathe operator for indicating the selected pulley drive unit speed setting.

Of the above components, the present invention is primarily concerned with the multi-speed drive train 54 including special mounting bracket 62 permitting ready interchangeability with the conventional pick off gear spider, and the carriage and apron structure 50. It will be appreciated, as the detailed description proceeds, that the novel components of multi-speed drive train 54 cooperate to coordinate the tool feed with the speed of spindle 36 independently of variable speed pulley drive 58 so as to efficiently assure a properly related workpiece speed-tool feed rate relationship.

MULTI-SPEED DRIVE UNIT

Variable-Speed Drive Assembly

Headstock spindle 36, according to the construction embodying the principles of the present invention, is conventionally journalled in a casing 67 and may be driven from motor 56 through the multi-speed drive train 54 at any of an infinite number of speeds within a predetermined range. As best shown in FIGURES 2-4, the drive train for headstock spindle 36 comprises a three-stage belt drive. The first stage is formed by a V-belt 70 drive connecting a pulley 72 fixed to the output shaft 74 of drive motor 56 and the input side of variable-speed pulley assembly 58 mounted for rotation about a shaft 76 which is supported for controlled concomitant lateral and axial displacement in a manner which will be hereinafter described. Motor 56 which may be of any conventional single speed type of suitable size, is adapted to be adjustably secured to a bench or frame (not shown) so that the axis of motor shaft 74 is parallel to the axis of headstock spindle 36.

The second stage of the belt drive is formed by a V-belt 78 drive connecting the output side of variable-speed pulley assembly 58 with the large diameter input pulley 80 (FIGURE 3) of an idler step pulley assembly 82 which is mounted for rotation on a non-rotatably supported shaft 84. The third stage of the belt drive is formed by a pair of V-belts 86 drive connecting the relatively small diameter pulley pair 88 constituting the output of the step pulley assembly 82 with a pulley pair 90 mounted coaxial with headstock spindle 36. Pulley 90 is selectively connectable to spindle 36 directly or through conventional back gearing (not shown) under control of a control knob 92 (FIGURE 1). As is fully described in United States Letters Patent to Reibig, bearing the Number 2,773,395 and issued December 11, 1956, the back gearing (not shown) selectively actuated by control 92 provides two ranges of speeds corresponding to the direct drive of the spindle and to the back gear drive.

Referring now to FIGURES 3 and 5, variable-speed pulley assembly 58 comprises a pair of spaced-apart fixed outer sheaves 96 and 98 having opposed V-belt engaging segmental conical faces 100 and 102 respectively, and an intermediate movable sheave 104 having engaging segmental conical faces 106 and 108 cooperatively opposed to faces 100 and 102 respectively. The three sheaves are coaxially mounted on a sleeve 110 (FIGURE 5) and sheaves 96 and 98 are rotationally and axially fixed to sleeve 110 by means of screws 112. Sheave 104, formed with opposed axial hub extensions 114 and 116, is mounted for axial displacement along sleeve 110 intermediate fixed sheaves 96 and 98, and is non-rotatably secured thereto by any suitable means (not shown). Hub extensions 114 and 116 respectively are adapted to fully interfit with aligned bores 118 and 120 in fixed sheaves 96 and 98 when sheave 104 is axially displaced to either its extreme left or right positions as viewed from FIGURE 5. The cylindrical outer faces of hubs 114 and 116 provide an annular base surface for the inner faces of the belts to engage when the pulley assembly 58 is so shifted that either of the belts 70 or 78 runs at the minimum pitch diameter of the pulley assembly.

With continued reference to FIGURE 5, sleeve 110 is journalled by means of spaced-apart bearing bushings 122 and 124 upon shaft 76 and is axially fixed relative to shaft 76 by means as will hereinafter the described. By means of this construction, it will be appreciated that sheaves 96, 98 and 104 and sleeve 110 constituting a sub-assembly, is journalled and balanced as a unit on shaft 76. Axial displacement of movable sheave 104 to the right as viewed from FIGURE 5 increases the pitch diameter of the pulley assembly cooperating with V-belt 70 and correspondingly reduces the pitch diameter of the pulley assembly cooperating with V-belt 78. Similarly, axial displacement of movable sheave 104 to the left as viewed from FIGURE 5, increases the pitch diameter of the pulley assembly cooperating with V-belt 78 and correspondingly reduces the pitch diameter of the pulley assembly cooperating with V-belt 70 to thereby provide for an infinite number of variations in pulley pitch assembly diameter throughout a predetermined range.

In order to support shaft 76 and to axially retain sleeve 100 on shaft 76, a pivotable swing bracket 126 is provided and comprises two parallel spaced-apart downwardly extending arms 128 and 130 interconnected adjacent corresponding ends by a cross-piece 132 as best shown in FIGURES 3 and 5. Pulley shaft 76 is secured in aligned machine bores 134 and 136 provided in arms 128 and 130 respectively by means of a set screw 138. Sleeve 110 is retained against axial displacement on pulley shaft 76 between opposed faces of arms 128 and 130.

In order to swingably mount swing bracket 126, a cast one-piece support bracket 140 is provided and is rigidly secured to the rear wall 142 of lathe bed 30 by means of machine screws 143 as best shown in FIGURE 6. Referring now to FIGURES 4-8, support bracket 140 is provided with a base plate portion 144 abutting the rear wall 142 of lathe bed 30, spaced parellel arms 146 and 148 rigidly extending perpendicularly outwardly from base plate 144 and a reinforcing web portion 150 extending between arms 146 and 148 along the upper edge of base plate 144. As best shown in FIGURES 4 and 8, an aperture 152 is provided in base plate 144 which registers with an aperture 154 formed in rear wall 142 of lathe bed 30. V-belt 78, which passes around pulley 80 located below bed 30, extends through the apertures 152 and 154 for drive connection to variable-speed pulley unit 58.

As best shown in FIGURES 7 and 8, arm 146 is substantially longer than arm 148 and both arms 146 and 148 are slightly bent in parallel fashion adjacent their outer ends to the right toward the headstock end of the lathe. A through tapped bore 156 is formed in the bent portion of arm 146 with its axis perpendicular to the opposed side faces of the arm bent portion. Similarly, a through tapped bore 158 is formed in the bent portion of arm 148 but at a shorter perpendicularly measured distance from the outer face of rear wall 142 which is substantially parallel to the rotational axis of headstock spindle 36 so that bore 158 is coaxial with bore 156. By this structure, the axes of bores 156 and 158 extend along a common straight line that is angularly offset with respect to a vertical plane containing the rotational axis of spindle 36 by a magnitude of substantially 5°.

Threadedly received in bores 156 and 158 are a pair of hanger bolts 160 and 162 which are adjustably retained in place by lock nuts 164. The ends of hanger bolts 160 and 162 are con-shaped as best shown in FIGURE 7, and engagingly extend into coaxially opposed spot bores 166 formed in end faces 168 and 170 at opposite ends of swing bracket cross-piece 132 to rotatably support swing bracket 126. As shown in FIGURE 7, end faces 168 and 170 are parallel and are inclined by substantially 5° so as to extend perpendicularly to the common axis of hanger bolts 160 and 162. Spot bores 166 are formed inwardly of and perpendicular to end faces 168 and 170 so that swing bracket 126 is rockable about a horizontally extending axis that is angularly offset relative to the parallel rotational axes of idler pulley shaft 84, motor shaft 74 and headstock spindle 36 by a magnitude of substantially 5°.

By this construction, it will be appreciated that swing bracket 126 which supports the variable-speed pulley unit 58 is swingable in a plane that is angularly offset to a plane normal to rotor shaft 74 and idler pulley shaft 84 by substantially 5°. When swing bracket 126 is in a vertical position as shown in FIGURES 6 and 7, it is contained in a vertical plane that extends parallel to the axes of motor shaft 74 and idler pulley shaft 84 since the effective length of support bracket arm 146 is longer than the effective length of support bracket arm 148. In this position belts 70 and 78 are properly aligned with respect to idler pulley 80, motor shaft pulley 72 and variable-speed pulley unit 58.

In order to vary the pitch diameter of the pulleys formed by sheaves 96, 98 and 104 of variable-speed pulley unit 58, swing bracket 126 carrying pulley unit 58 is rocked in the desired direction about its pivotal axis formed by hanger bolts 160 and 162 so that the variable-speed pulley unit 58 is laterally shifted toward or away from motor shaft 74 and correspondingly away or toward idler pulley shaft 84. Such variations in the lateral distances between motor shaft 74 and variable-speed pulley shaft 76 and between idler pulley shaft 84 and shaft 76 causes changes in the tension in belts 70 and 78. Thus, if the tension in V-belt 70 is reduced and the tension in V-belt 78 is increased by shifting shaft 76 toward motor shaft 74, the difference in pressure of these belts on movable sheave 104 will axially displace sheave 104 to the right as viewed from FIGURE 5. Movement of shaft 76 toward idler pulley shaft 84 will correspondingly cause movable sheave 104 to shift to the left.

However, it will be appreciated that as the pitch diameters of variable-speed pulley unit 58 are changed by lateral displacement of movable sheave 104, the centers between fixed sheave 96 and movable sheave 104 and between fixed sheave 98 and movable sheave 104 are correspondingly shifted. Thus, if variable-speed pulley shaft 76 is only laterally displaced relative to its own axis and to the axes of motor shaft 74 and idler pulley shft 84, the belts 70 and 78 drivingly interconnecting pulleys 72 and 80 with pulley unit 58 would become misaligned and twisted with resultant wear and premature failure.

According to the present invention, however, since the swing bracket 126 rocks pulley shaft 76 in an arc that is angular offset to a plane extending normal to shafts 76 and 84, the variable speed pulley shaft 76 is bodily axially displaced as the shaft is swung in either direction. Consequently, the axial displacement of shaft 76 concomitant with lateral displacement thereof results in maintaining V-belts 70 and 78 in planes substantially perpendicular to the axes of motor shaft 74 and idler pulley shaft 76 to thereby assure proper alignment of belts 70 and 78 as the centers between variable-speed pulley sheaves 96, 98 and 104 are shifted. The axial displacement of shaft 76 together with swing bracket 126, is of such an extent and is so controlled concomitantly with the lateral displacement of shaft 76 to effect speed variations that proper alignment of belts 70 and 78 relative to pulleys 72 and 80, respectively, is substantially maintained. By proper alignment as used herein, it is meant that the path in which the belt runs is normal to the axes of the pulleys in which it engages.

With the present invention, belt 70 drivingly interconnecting motor pulley 72 with variable-speed pulley unit 58 does not fully remain in a single plane as variable-speed pulley shaft 76 is rocked about the common axis of hanger bolts 160 and 162, but rather becomes slightly twisted. The same condition exists with respect to V-belt 78. The slight twists imparted to belts 70 and 78, however, are minimized by determination of the position of variable-speed pulley shaft 76 with respect to the axis of rotation of swing bracket so that the magnitude of angular offset of shaft 76 with respect to shafts 74 and 84 is held to a minimum value throughout the entire swing of shaft 76. As a consequence, the twist of belts 70 and 78 established by rocking shaft 76, is so slight that it is of no practical consequence to the operating efficiency of the variable drive unit or to the expected life of belts 70 and 78.

Referring now to FIGURES 3, 4, 6 and 8, a jack lever 170 is provided for mounting idler pulley shaft 84 and for providing adjustments in the tension of V-belts 86. As best shown in FIGURE 3, jack lever 170 is provided with a bore 172 which rotatably receives the free end of a pivot shaft 174. Pivot shaft 174 extends into and is fixed in a bore 176 (FIGURE 4) formed in a generally cylindrical boss 178 cast rigid with support bracket 140 adjacent the bottom edge of base plate 144 so that the axes of bore 176 and shaft 174 are parallel to the axes of motor shaft 74 and spindle 36. Jack lever 170 is axially held in place on the inwardly extending end of pivot shaft 174 between a retainer ring 180 secured to shaft 174 and the inner end face of boss 178 and is rotatably supported on shaft 174 so as to extend inwardly through aperture 154 in lathe bed rear wall 154 as best shown in FIGURE 4. The inner end of jack lever 170 is formed with a through bore 182 extending parallel to pivot shaft 174 which receives one end of idler pulley shaft 84. Idler step pulley assembly 82 is rotatably mounted on the free end of pulley 84 and is axially held in place by any suitable means (not shown).

By this construction, it will be appreciated that V-belt pairs 86 support the free end of pulley shaft 84 and the inner end of jack lever 170 against clockwise rotation as viewed from FIGURE 4.

In order to prevent counterclockwise rotation of jack lever 170 from an adjusted position and to provide an adjustment for adjusting the tension of V-belts 86, a bolt 184 is provided and is threaded through a tapped hole in bore plate 144 of support bracket 140 along an axis transversed to the axis of pivot shaft 174 so that the end of bolt 184 abuts the vertical face of an ear 186 formed integral with jack lever 170. Bolt 184 threadedly receives a tightening nut 188 which is adapted to axially secure bolt 184 in place.

By backing off tightening nut 188 and by threading bolt 184 into base plate 144, as viewed from FIGURE 4, jack lever 170 is rotated in a clockwise direction so as to lower the rotational axis of idler pulley assembly 82 and thereby increase the tension in V-belt pairs 86. Correspondingly, threading bolt 184 out of base plate 144 permits V-belt pairs 86 to raise idler pulley assembly 82 and thereby reduce the tension in the belts.

By means of this structure, it will be appreciated that rotation of jack lever 170 and consequent movement of idler pulley 80, together with pulley shaft 84, does not materially change the distance between idler pulley shaft 84 and variable speed pulley shaft 76 so that the tension in V-belt 78 drivingly interconnecting idler pulley 80 with variable speed pulley unit 58 is not affected when the tension in V-belt pairs 86 is adjusted.

Speed Control Unit

In order to selectively control the position of swing bracket 126 from an operating position in front of the lathe and thus effect variations in the speed of the drive mechanism, speed control mechanism 63 is provided. It comprises an inherently resilient adjusting screw 192 rotatable about an axis generally transverse to the rotational axis of spindle 36 and extending beyond the front and rear walls of lathe bed 30 as best shown in FIGURES 2 and 4. Referring now to FIGURES 2, 4, 6 and 8, the rearwardly extending portion of adjusting screw 192 is provided with a threaded end section 193 (FIGURE 4) that engages a centrally located tapped bore formed transversely through a cylindrically shaped swivel nut 194. Swivel nut 194 is mounted in aligned bores formed in the side walls of a yoked portion 196 which integrally depends from the lower end of arm 130 of swing bracket 126.

Figure 9:
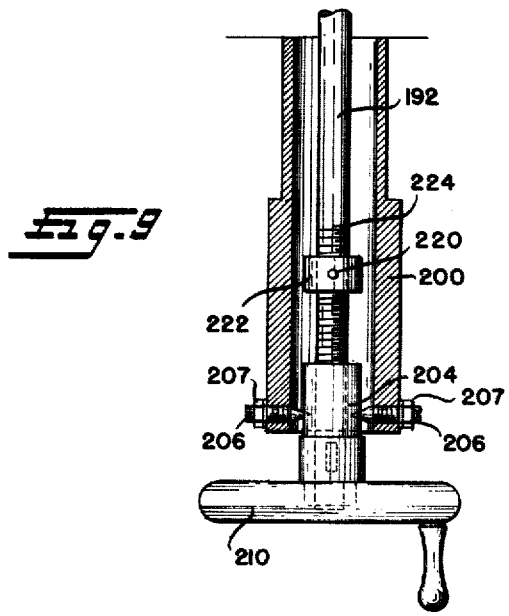
FIGURE 9 is an enlarged fragmentary sectional view taken along line 9—9 of FIGURE 1.

The end of adjusting screw 192 projecting beyond the front wall of lathe bed 30 extends through a hollow generally tubular shaped cast bracket 200 which is rigidly secured to lathe bed 30 by means of screws 202. As best shown in FIGURE 9, the forward end of adjusting screw 192 is supported in bracket 200 by a bushing 204 which rotatably receives adjusting screw 192 and is pivotally mounted in bracket 200 by opposed coaxial headless set screws 206 threadedly engaged in horizontal transversely extending opposed tapped bores 206. The ends of screws 206 projecting into the interior of bracket 200 are cone-shaped and engage in transverse spot bores formed in bushing 204 so as to permit bushing 204 to pivot about an axis formed by screws 206. Tightening nuts 207 threadedly engaging set screws 206 lock the set screws in place.

In order to rotate adjusting screw 192, a handwheel 210 is provided and is fixedly secured by any suitable means to the end of adjusting screw 192 extending beyond bracket 200 so as to be readily accessible for operation. Limit nuts 212 (FIGURE 4) threadedly engaging the end section of adjusting screw 192 a predetermined spaced distance on either side of swivel nut 194, are provided to limit the travel of swing bracket 126 together with swivel nut 194.

By this construction, it will be appreciated that by turning handwheel 210 in a clockwise direction to thread adjusting screw 192 into swivel nut 194, swing bracket 126, together with variable-speed pulley unit 50, is rotated about the axis of hanger bolts 160 and 162 for lateral displacement toward motor shaft 74. Correspondingly, threading adjusting screw 192 out of swivel nut 194, rotates swing bracket 126 in the opposite direction to bring variable-speed pulley shaft 76 laterally closer to idler pulley shaft 84.

Since adjusting screw 192 is pivotably mounted in bracket 200 about the axis of set screws 206, raising and lowering of the rearward end of adjusting screw 192 engaged with swivel nut 194 as swing bracket 126 is rocked about its axis, will cause adjusting screw 192 to rotate about the axis of set screws 206 concomitantly with the rotational motion imparted to swing bracket 126. As hereinbefore described, swing bracket 126 is pivotally mounted about a canted horizontal axis which is offset with respect to motor shaft 74 and idler pulley shaft 84 by 5°. In vertical position, swing arm 126 is disposed in a plane that is parallel to vertical planes containing the rotational axes of motor shaft 74 and idler pulley shaft 84 so that adjusting screw 192 is straight and horizontally extends normal to the axis of swivel nut 194 and therefore to shafts 74, 76 and 84. As swing bracket 126 is rotated in its laterally arcing path to shift in a direction parallel to the axis of motor shaft 74 so that the axis of swivel nut 194 is moved slightly out of a vertical plane extending parallel to the axis of motor shaft 74 and into a slightly canted plane, the inherent resiliency of adjusting screw 192 permits the screw to follow swivel nut 192 in its laterally swinging arc by causing the adjusting screw to bend in a lateral direction with respect to its own axis. The bending of adjusting screw 192 out of a vertical plane causes the threads of the end section of screw 192 to bindingly engage with the threads of the tapped bore of swivel nut 194 to thereby automatically lock swing bracket 126 and variable-speed pulley unit 58 in adjusted position.

In order to indicate the adjusted speed setting of variable-speed pulley unit 58, a centrally longitudinally slotted indicator plate 214 having a graduated scale is mounted on the top flat face of support bracket 200 so that the slot in plate 214 registers with a longitudinally extending elongated slot 218 formed in bracket 200 and communicating with the interior thereof. An indicator pin 220 is carried by a nut 222 which axially moves on a threaded section 224 of adjusting screw 192 that is of lesser pitch than threaded end section 193 to provide for a proportionately shorter travel of pin 220 as adjusting screw 192 is rotated. Pin 220 projects upwardly through slot 218 so as to prevent nut 222 from turning on threads 224 and cooperates with the graduated scale on plate 214 to indicate the set speed of variable-speed pulley unit 58. By this construction, the variable pulley set speed is simply and effectively established and the setting is positioned in a place to be readily viewable by the operator.

The mechanism thus described which substantially assures proper belt alignment through axial displacement of the variable-speed pulley assembly 58 throughout the range of speed variation resulting from lateral displacement of that assembly, also functions through swivel nut 194 and inherently resilient adjusting screw 192 to resist lateral or axial displacement of swing bracket 126 and variable-speed pulley assembly 58 under influence of variations in tension of V-belts 70 and 78 resulting from cutting stresses tending to vary the headstock spindle speed which in prior variable-speed pulley structures caused periodic high frequency axial movement of the movable sheave 104 with consequent slapping noise, fluctuations from selected speed and belt wear. Due to the laterally curving arcing movement of swivel nut 194 together with swing bracket 126 and variable-speed pulley assembly 58 and the inherent resilience of adjusting screw 192 threadedly engaged in nut 194, this structure for laterally and axially displacing variable-speed pulley assembly 58, is non-overrunning in that once pulley assembly 58 has been selectively positioned, it will remain locked in selected position without the need for an additional locking mechanism since the bending of adjusting screw 192 in swivel nut 194 causes the cooperating threads therebetween to become lockingly engaged. Thus, adjusting screw 192 may be readily and rapidly further adjusted by manipulation of handwheel 210 without first giving attention to a separate locking mechanism and may be accomplished without stopping the lathe.

*Feed Stop and Reverse Mechanism*

Referring now to FIGURES 10 and 11, a stop and reverse fed mechanism 61, drivingly interconnecting the input of gear box 60 with spindle 36 for stopping and reversing the feed to carriage 40, is mounted in headstock 67 and comprises a feed reverse lever 234 having a hollow cylindrical portion 236 (FIGURE 11) suitably journalled in a bore 238 formed in the headstock below spindle 36 so that lever 234 is rotatable about an axis that is parallel to the rotational axis of spindle 36. A reversing stud 240 extends through a longitudinal through bore 242 formed in cylindrical portion 236 along the axis of rotation of lever 234 and is journalled therein by means of axially spaced-apart bushing sleeves 244 and 246. Non-rotatably mounted on the end of stud 240 extending beyond lever 234 by means of a key 247 are axially abutting stud driving and driven gears 248 and 250 respectively, which are axially held in place between a nut 252 received on the threaded end section of stud 240 and the vertical face of an integral flange 254 of the reverse feed lever 234. Driven gear 250 is in constant meshing engagement with the input gear of gear box 60 as will be more fully explained, and drive gear 248 constantly meshes with an idler gear 256 rotatably mounted on a stud 258 (FIGURE 10) fixedly secured to lever flange 254 so that the center of the rotational axis of idler gear 256 is parallel to and somewhat laterally offset to the right of the center of stud 240 in the position shown in FIGURE 10.

With continued reference to FIGURE 10, a further idler gear 260 is rotatably mounted on a stud 262 which is fixedly secured in lever flange 254 parallel to the rotational axes of stud 240 and idler gear 256 and, in the position shown, is offset to the left of the axis of stud 240 in a horizontal plane containing the rotational axis of idler gear 256. In order to rotate reverse feed lever 234 so as to arcuately shift idler gears 256 and 260 between their operating positions, a handle 264 is threadedly engaged in an integral extension 266 of lever 234 and extends outwardly and upwardly at an angle to provide ease of operation upon the part of the operator. By this structure, it will be appreciated that reverse feed lever 234 together with idler gears 256 and 260 rotate as a unit about the axis of stud 240 by manipulation of handle 264.

In the position of lever 234 shown in FIGURES 10 and 11, idler gear 256 is in meshing engagement with a spindle gear 268 fixed to the lefthand end of spindle 36 as viewed from FIGURE 11 to thereby establish a drive connection between stud drive gear 248 and spindle gear 268 through idler gear 156 intermeshing with gears 268 and 248 so as to rotate stud 240 and the driven stud gear 250 in the same direction as spindle 36. In order to reverse the rotation of stud 240 and driven stud gear 250, handle 264 is shifted in a clockwise direction from the position of FIGURE 10 to rotate idler gear 256 out of engagement with spindle gear 268 and to swing idler gear 260 into mesh with spindle gear 268. In this reverse feed lever position, a drive connection is established between spindle gear 268 and driving stud gear 248 through both of the intermeshing idler gears 256 and 260 to reversely rotate stud 240 and driven stud gear 250 relative to the rotation of spindle 36.

In order to establish a positive stop for reverse feed lever 234 in its extreme rotational operating positions and to provide a lock therefor, a bolt 270 (FIGURE 10) extending through a washer 271 and an arcuately shaped radial slot 272 formed in lever extension 266 adjacent handle 264, threadedly engages in a tapped bore formed in the end face of headstock 67, as shown in FIGURE 12, so that the axis of bolt 270 is parallel to the rotational axis of stud 240. The arcuate length of slot 272 is such that bolt 270 abuts the bottom edge of slot 272 when idler gear 256 engages spindle gear 268 in one operating drive position and abuts the upper edge of slot 272 when idler gear 260 meshes with spindle gear 268 in the other operating position. By threadedly tightening bolt 270, it will be appreciated that reverse feed lever is held rigid with headstock 67 so as to prevent movement of the lever by manipulation of handle 264. Thus, to shift reverse feed lever 234 between operating positions, bolt 270 is first unthreaded, and handle 264 is manipulated to rotate reverse feed lever 234 to either of its extreme drive positions as hereinbefore described, or to a neutral non-driving position intermediate the extreme drive positions where bolt 270 is centered in slot 272 and both idler gears 256 and 260 are out of meshing engagement with spindle gear 268. Bolt 270 is then retightened to rigidly secure reverse feed lever 234 in its selected position.

By drivingly interconnecting driven stud gear 250 to lead screw 52 by geared means as will be hereinafter described, it will be appreciated that the positioning of reverse feed lever 234 in one or the other of its extreme up and down operating positions causes lead screw 52 to rotate in one direction or the other. When lever 234 is positioned in its intermediate neutral position, the feed to lead screw 52 from spindle 36 is interrupted and lead screw 52 is not rotated.

A gear casing 274 as best shown in FIGURES 1 and 2 fixed to headstock 67 by means of screws 275, cooperates with headstock cover 276 hinged to headstock 67 to provide an enclosure for the stop and reverse feed gear mechanism 61. A suitable aperture 277 (FIGURE 1) is formed in gear casing 274 through which handle 264 projects.

Quick Change Gear Box Transmission and Support Bracket

Figure 19A:
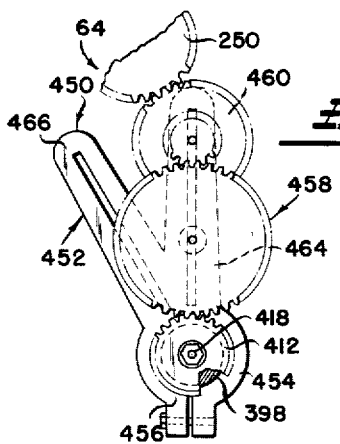
FIGURE 19a is a fragmentary left-hand or head stock end elevational view partially in section and illustrating a conventional pick-off gear spider mounted on the special mounting bracket shown in FIGURE 19.
Figure 19:
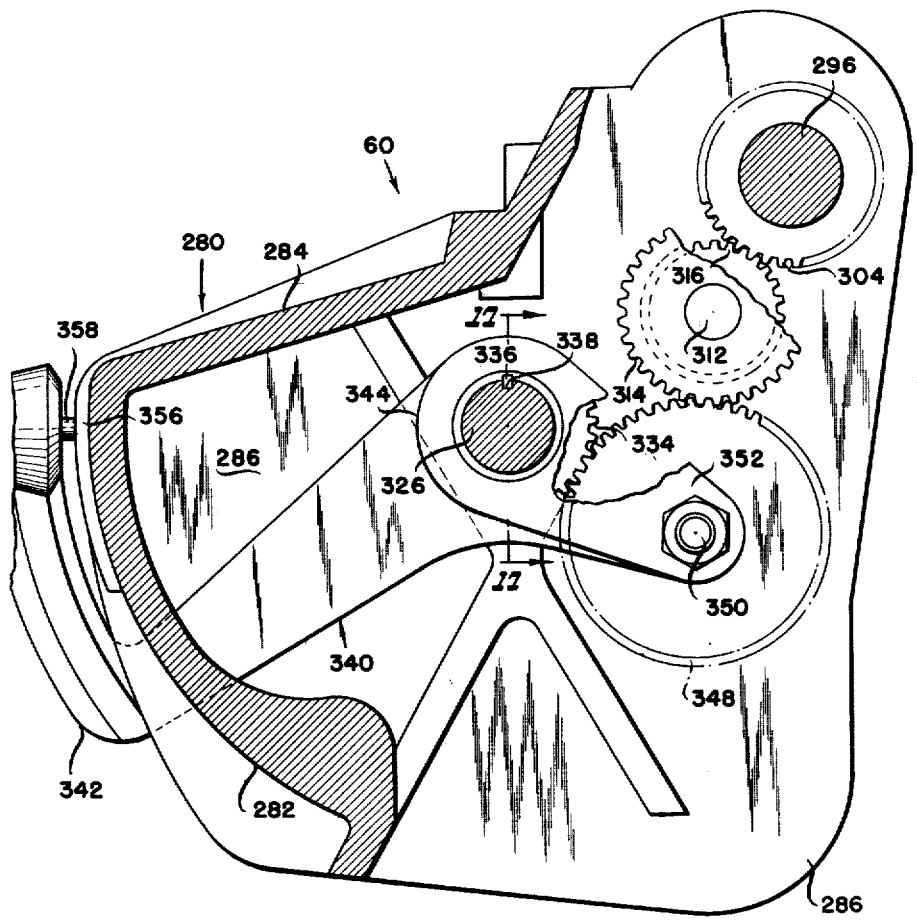
FIGURE 19 is an enlarged fragmentary front elevational view partially in section and illustrating the special mounting bracket for the quick change gear box transmission shown in FIGURE 13 permitting ready interchangeability with a conventional pick-off gear spider and the shear pin assembly feed screw connection.

The quick change gear box transmission generally designated at 60, FIGURE 1, functions to deliver a selected fixed ratio of headstock spindle speed to feed screw 52 to correlate the feed of tool post 43 with the rotational speed of spindle 36 and, as described, is in the form of an attachment unit capable of being mounted on special feed screw support bracket 62 in place of the conventional pick off gear spider 64 shown in FIGURE 19.

Referring now to FIGURES 13–16, gear box 60, having a unique construction to provide ease of operation upon the part of the operator, is shown to comprise a specially constructed one-piece casing 280 having an outwardly curved apertured front wall 282, a flat-sided thread and feed plate 284 rigid with the upper edge of the front wall and extending rearwardly along a slightly upwardly inclined plane, opposed parallel side walls 286 and 288 providing an enclosure with front wall 282 and feed plate 284 and a central apertured rib 290 extending inwardly from front wall 282 in parallel relationship to side walls 286 and 288 and approximately equidistantly therefrom.

Rotatably mounted in axially aligned bores formed in wall 286 and a vertical protuberant integral flange 292 of apertured central rib partition 290 in parallel relationship to the axis of spindle 36, is a gear box input shaft 296.

Fixedly secured to the lefthand end of shaft 296 extending beyond flange 292 into an upwardly facing recess 297 in rib 290 is an input gear 298 which is in constant meshing engagement with the driven stud gear 250 mounted on stud 240 of stop and reverse mechanism 61. By means of this structure, gear box input gear 298 constitutes a component part of gear box transmission 60 and engages directly with the driven output gear 250 of the spindle gear box stop and reverse mechanism to obviate the need for the installation of an independent connector gear when gear box 60 is mounted on the lathe in place of the conventional gear spider 64.

Between central rib 290 and side wall 286, a driven compound gear assembly 300 and an idler compound gear assembly 302 are supported on input shaft 296 in axial abutting relationship. Compound gear assembly 300 is non-rotatably fixed to shaft 296 and includes a large gear 304 and a small gear 306 fixed to gear 304 to form a unitary rotating gear pair. Idler compound gear assembly 302 is rotatably mounted on input shaft 296 by any suitable means and includes a large gear 308 and a small gear 310 fixed to gear 308 to form a unitary rotating gear pair free for unitary rotation about the axis of shaft 296.

Below and laterally offset to the left of input shaft 296, as viewed from FIGURE 15, is a cross shaft 312 non-rotatably fixed to central rib 290 and wall 286 along an axis that is parallel to the rotational axis of input shaft 296. Rotatably mounted on shaft 296 in successive axially aligned relationship are alternatingly large and small gears 314, 316, 318, 320, 322 and 324. As best shown in FIGURES 13 and 16, large gears 314, 318 and 322 are respectively fixed to relatively small gears 316, 320 and 324 to form three independent unitary gear pairs rotatable about fixed shaft 312.

With continued reference to FIGURES 13 and 16, gears 316, 318, 320 and 322 are respectively in constant meshing engagement with gears 304, 306, 308 and 310 mounted on input shaft 296.

By this structure, it will be appreciated that by drivingly connecting gears 314, 316, 318, 320, 322 or 324, six different drive trains are provided for and consequently six different gear ratios with a corresponding number of speed ranges proportionate to the spindle speed are available. The first of these drive trains is established between gears 304 and 314 through gear 316. The second drive train is established directly between intermeshing gears 304 and 316. The third drive train is established directly between gears 306 and 318. The fourth drive train is established between gears 304 and 320 through gear 318. The fifth drive train is established between gears 306 and 322 through gears 318, 320, 308 and 310 while the last drive train is established between gears 306 and 324 through gears 318, 320, 308, 310 and 322.

Figure 17:
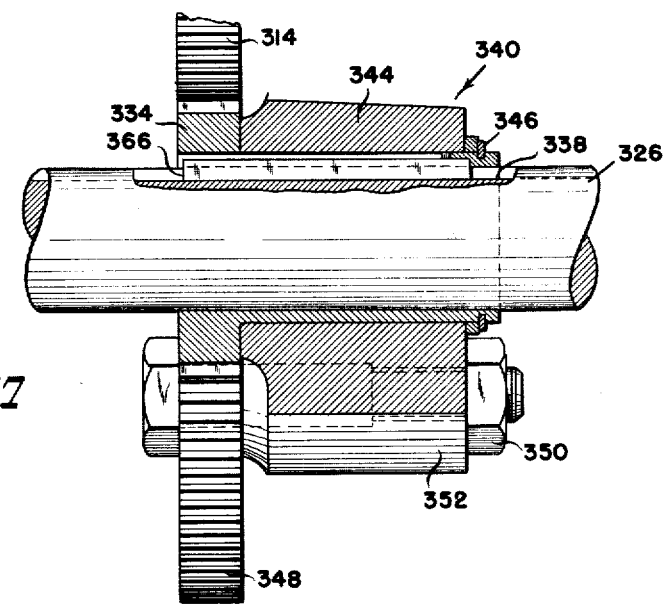
FIGURE 17 is an enlarged sectional view taken along line 17—17 of FIGURE 15.

Referring now to FIGURES 15, 16 and 17, the means for facilitating individual selection of the six gear ratios by engaging the gears mounted on cross shaft 312 and for transmitting the power delivered from the spindle 36, comprises a transfer shaft 326 extending through the aperture of central rib 290 and journalled adjacent its ends in aligned bores formed in side walls 286 and 288 so as to be rotatable between side walls 286 and 288 about an axis parallel to that of shafts 296 and 312. As best shown in FIGURE 13, transfer shaft 326 is retained against axial displacement by collars 328 and 330 fixed by means of set screws 332 on the ends of shaft 326 extending beyond the planar faces of side walls 286 and 288, respectively. Shaft 326 carries an axially slidable transfer gear 334 having an elongated hub non-rotatably supported on shaft 326 by means of a key 336 received in a longitudinal slot 338 in shaft 326. Key slot 338 extends the entire length of shaft 326 so that transfer gear 334 is axially shiftable between side wall 286 and central rib 290.

In order to axially move transfer gear 334 along the axis of shaft 326, a tumbler lever 340 is provided and has a laterally projecting generally L-shaped manipulating arm 342 cast rigid with a generally cylindrical hollowed longitudinal boss 344 (FIGURES 15 and 17) rotatably supported on the hub extension of transfer gear 334 and axially retained thereon between the radial face of gear 334 and a retainer ring 346 positioned in a circumferential groove at the end of the gear hub extension.

A transfer idler gear 348 constantly meshed with transfer gear 334 is rotatably supported on a pivot stud 350 secured about an axis parallel to that of transfer shaft 326 in an integral laterally extending flange 352 of tumbler lever 340. This gear 348 is positioned by axial and rotational movement of tumbler lever 340 to provide for selective meshing engagement with any one of gears 314, 316, 318, 320, 322, or 324 on cross shaft 312 to thereby transmit power from the gears on cross shaft 312 to transfer gear 334 for rotating transfer shaft 326 at six different major speeds.

As shown in FIGURE 13, manipulating arm 342 of tumbler lever 340 extends through an aperture 354 in casing front wall 282 between central rib 290 and side wall 286 and projects upwardly in front of the gear box casing 280 to cooperate with a series of spaced-apart gear change finding guide vanes 356 cast integrally with casing 280 forming tumbler-engaging grooves corresponding in number and relative position to the six major speeds obtainable from the gears 314, 316, 318, 320, 322 and 324 on cross shaft 312. The indexing plate 284 has columns coinciding with the grooves between guide vanes 356 which show the various speeds obtainable for selected positions of tumbler 340. A suitable spring loaded retaining pin 358 (FIGURE 15) engagingly cooperates with finding detents 360 (FIGURE 13) between vanes 356 to rigidly hold tumbler lever 340 in its selected gear-engaging position.

By this structure, it will be appreciated that six major speeds are available to drive transfer shaft 326 by means of selectively manipulating tumbler lever 340 starting with the highest speed by drive engagement with gear 314 immediately adjacent central rib 290 and progressively slower speeds as the tumbler lever is moved toward side wall 326 to the lowest major speed available by engagement of gear 324.

In order to provide for a wide selection of speeds within the range of each of the major speeds available to drive transfer shaft 326, a cone of gears 362 having nine individual gears is provided and is non-rotatably keyed to a cone gear output shaft 364 and axially retained in proper position on shaft 364 between the flat smooth axially opposed faces of apertured longitudinal bosses 366 and 368 cast rigid with side wall 288 and central rib 290 of gear box casing 280. Shaft 364 is journalled in aligned bores formed in bosses 366 and 368 along an axis parallel to that of transfer shaft 326.

Figure 14:
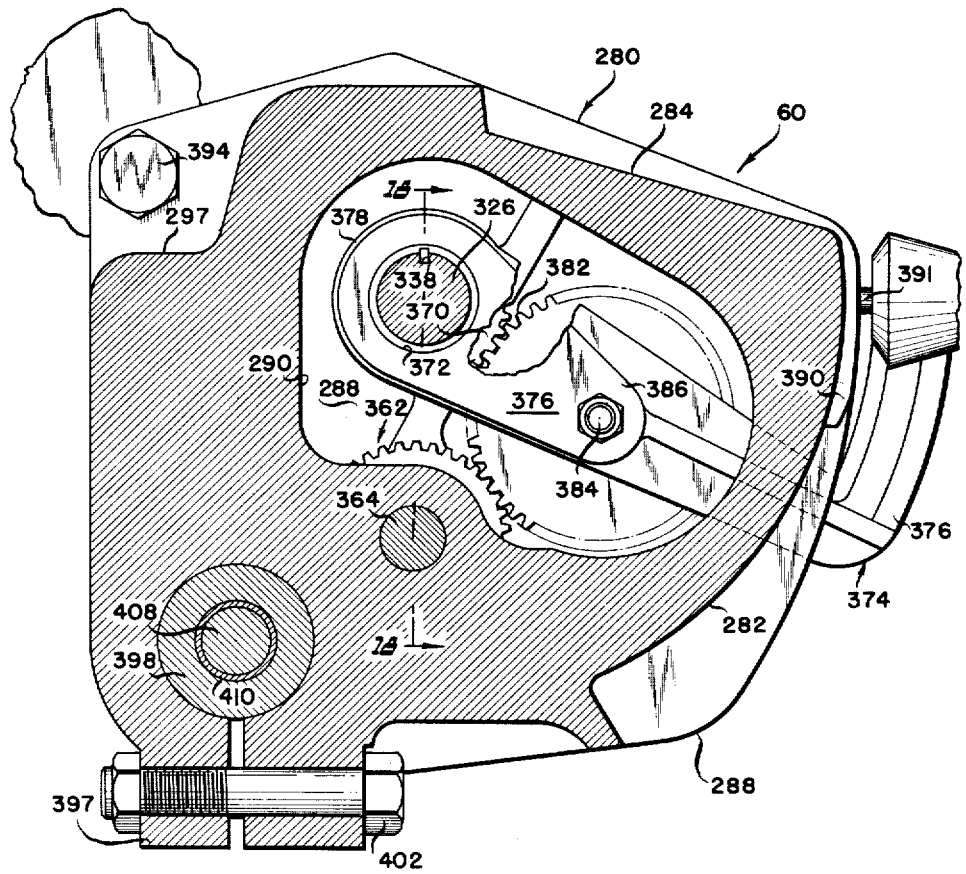
FIGURE 14 is a sectional view taken along lines 14—14 of FIGURE 13.
Figure 18:
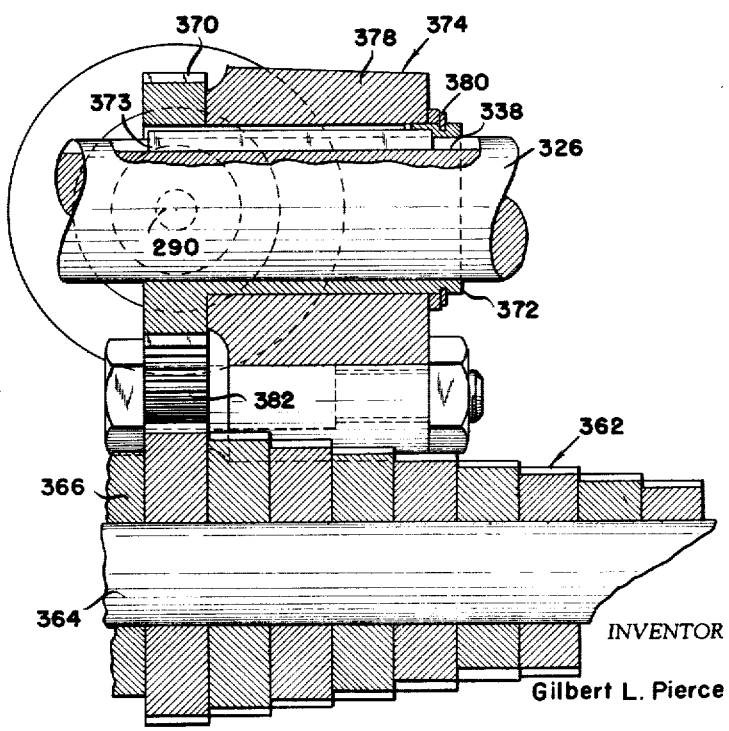
FIGURE 18 is an enlarged sectional view taken along lines 18—18 of FIGURE 14.

Referring now to FIGURES 14, 16 and 18, the means for selecting the individual gears of the gear cone 362 and for drivingly connecting transfer shaft 326 to cone gear output shaft 364 comprises a transfer gear 370 having an elongated hub extension 372 rotatably fixed to transfer shaft 326 by means of a key 373 positioned in longitudinal slot 338 to permit axial movement of gear 370 along shaft 326.

The means for axially moving transfer gear 370 along the axis of shaft 326 comprises a tumbler lever 374 having a laterally projecting generally L-shaped manipulating arm 376 cast rigid with a generally cylindrical hollowed longitudinal boss 378 rotatably supported on hub extension 372 of transfer gear 370 and axially retained thereon between the radial face of gear 370 and a retainer ring 380 (FIGURE 18) positioned in a circumferential groove at the end of gear hub extension 372.

A transfer idler gear 382 is rotatably supported on a pivot stud 384 secured about an axis parallel to that of transfer shaft 326 in integral web portion 386 of tumbler 374. This gear 382 is positioned by axial and rotational movement of tumbler lever 374 to provide for selective meshing engagement with any one of the nine gears of gear cone 362 on output shaft 364 to thereby transmit power from transfer shaft 326 to output shaft 364 through the selective gear of the gear cone 362.

As best shown in FIGURE 13, manipulating arm 376 of tumbler lever 374 extends through an aperture 388 in casing front wall 282 between central rib 290 and side wall 288 and projects upwardly in front of the gear box casing 280 to cooperate with a series of spaced-apart gear change finding vanes 390 cast integral with casing 280 to form tumbler engaging grooves corresponding in number and relative position to the nine speeds obtainable from the nine gears of gear cone 362 on output shaft 364. Indexing plate 284 is provided with columns coinciding with the grooves between vanes 390 which show various threads and feeds obtainable for selected positions of tumbler 376 between selected adjacent guide vanes 390. A suitable spring-loaded retaining pin 391 (FIGURE 14) engagingly cooperates with finding detents 392 (FIGURE 13) between vanes 390 to rigidly hold tumbler lever 374 in its selected gear engaging position.

Fixedly secured to the righthand end of output shaft 364 extending beyond central rib 290, as viewed from FIGURE 16, is an output gear 393 adapted to be drivingly connected to lead screw 52. By this structure, it will be appreciated that by selective manipulation of tumbler lever 374 for engagement with a selected one of the nine different sized gears for gear cone 362, nine different speeds are available for driving the gear box output gear 396 for each of the six major speed ranges obtainable by manipulation of tumbler lever 340. Thus, 54 different ratios and consequently a corresponding number of speeds are available by manipulation of tumbler levers 340 and 374 to rotate output shaft 364 at 54 different speeds, all of which are a fixed ratio to the speed of spindle 36 by virtue of the gear reduction trains above described.

In accordance with the present invention, the means for the headstock. At the bottom of gear box 60, as best shown in FIGURES 13 and 16, comprises a suitable bolt 394 which passes through an upwardly extending integral ear 395 of central rib 290 and threadedly engages in a tapped bore 396 provided inwardly of the smooth side face of headstock 67 so as to rigidly hold the gear box to the headstock. At the bottom of gear box 60, as best shown in FIGURES 13, 14, 16 and 19, casing 280 is provided with a downwardly extending split collar 397 cast integral with central rib 290 and rigidly secured in surrounding relationship to a protruding end of a hollow cylindrically shaped longitudinally extending boss 398 (FIGURE 19) of a special support bracket 400 by means of a bolt and nut assembly 402 passing diametrically through the lower ends of the ears of split collar 397 so as to rigidly support gear box 60 on mounting bracket 400 with shafts 364, 326, and 296 extending along an axis that is parallel to that of headstock spindle 36.

Referring now to FIGURE 19, support bracket 400 extending between gear box 60 and lathe bed 30, is a one-piece casting rigidly mounted on the front wall of lathe bed 30 by means of bolts 402 passing through flange portions 404 cast integral with cylindrical boss 398 so that the axis of boss 398 is always parallel to the rotational axis of spindle 36. An integral annular shoulder 406 extending radially outwardly from boss 398 abuts the end face of gear box split collar 397 to provide an aligning axial stop to squarely position gear box casing 280 in place on boss 398.

The means for drivingly interconnecting gear box output gear 393 with lead screw 52 comprises a drive shaft 408 journalled in boss 398 by means of axially fixed sleeve bushings 410 of bearing material. Non-rotatably fixed by means of a key 411 on the reduced diameter end of shaft 408 where it extends beyond the lefthand end of boss 398 as viewed from FIGURE 19, is a lead screw drive gear 412. Gear 412 meshes with gear box output gear 393 and is axially held in position between the smooth flat lefthand end face of boss 398 and an annular spacer 414 abutting a washer 416 which are axially retained on shaft 408 by means of a nut 418 threadedly received upon the end of shaft 408.

A coupling collar 420 is non-rotatably fixed on the righthand end of shaft 408 where it extends beyond boss 398 as by key 422 so that it coaxially abuts the smooth flat righthand end radial face of the boss 398. Key 422 engages in a longitudinal slot 423 formed in collar 420. By means of this structure, drive shaft 408 together with gear 412 and spacer 414 are axially held in position by tightening up nut 418.

Thus by means of the gear box casing split mounting collar and simplified permanently fixed mounting bracket construction above described, it will be appreciated that gear box 60 is readily removed by first removing gear cover 274 to provide access to the rear of gear box casing 280 and the end mounting bracket 400. The bolt of nut and bolt assembly 402 securing gear box casing split collar 397 to bracket boss 398 is then loosened and the lead screw drive shaft nut 418 is removed together with spacer 414 and gear 412. By now removing bolt 394 at the top of gear box casing 280, the entire gear box unit 60 can be slipped axially off bracket boss 398.

A completely conventional pick off gear spider 64, as shown in FIGURE 19a, having a rigid one-piece pick off gear mounting bracket 452 formed with a longitudinal depending split collar 454 is now readily and quickly substituted for the detached gear box 60 by simply axially sliding split collar 454 onto bracket boss 398 and fixedly securing spider bracket 452 thereon by tightening nut and bolt assembly 456 extending through the adjacent ear portions of split collar 454. A train of gears indicated at 458 providing a selected gear reduction ratio and having an input gear 460 and an output gear 462, are conventionally mounted on a slotted arm 464 cast integral with split collar 454.

Nut 418, spacer 414 and gear 412 removed for detaching gear box 60, are replaced on drive shaft 408 and gear 412 is meshed with spider output gear 462. Spider input gear 460 is positioned to mesh with driven gear 250 of stop and reverse feed mechanism 61 so that power is transmittable from spindle 36 to lead screw 52 through the spider gear train 458 and lead screw drive shaft 408.

Spider 64 is provided, in accordance with conventional design, with a further slotted arm 466 for suitably mounting a train of gears (not shown) having a different selected gear ratio from that of gear train 458. By this structure, bolt and nut assembly 456 can be loosened so as to permit spider 450 to be rotated about bracket boss 398 to drive connect the train of gears (not shown) mounted on arm 466 with gear 250 and gear 412.

Thus, a completely conventional pick off gear spider assembly is readily interchangeable with gear box unit 60 and both the spider 64 as shown in FIGURE 19, and gear box 60 are interchangeably mountable on the same permanently fixed mounting bracket 400 without necessitating any modification in the structure of the lathe or replacement of or disturbing of other component parts of the lathe.

*Feed Screw Shear Pin Support Construction*

Mounting bracket 400, in addition to interchangeably supporting spider 450 or multi-speed gear box 60 without the need of additional parts, also functions by means that will now be described to provide a supporting shear pin connection for lead screw 52 in cooperation with coupling collar 420 which is permanently mounted on bracket 400.

Thus, in order to drivingly connect drive shaft 408 to lead screw 52, coupling collar 420 coaxially receives the lefthand reduced diameter slotted end 474 of lead screw 52 which is non-rotatably fixed to coupling collar 420 by means of a shear pin 476 having a cylindrical body portion 477 received in a bore 478 formed transversely of lead screw 52 and slot 479. Shear pin 476 is provided with an enlarged head 480 extending beyond bore 478 and slidably engaged in longitudinal keyway 423 so as to provide a driving engagement therewith. By this structure, it will be appreciated that shear pin 476 permits lead screw 52 to be loaded only to a predetermined magnitude as determined by the cross sectional area of cylindrical section 477 adjacent to head 480 and the structural shearing strength thereof, and prevents an overload on lead screw 52 from damaging the apron parts or the more fragile and highly loaded gear train in the quick change gear box unit 60. Under conditions where an overload is applied to lead screw 52, head 480 of pin 476 will be sheared off thus dis-establishing the driving connection between lead screw 52 and connecting collar 420 to thereby prevent damage to the lead screw by overload conditions.

As best shown in FIGURE 1, lead screw 52 extends between lathe bed 30 and apron 50 where it is engaged by a half nut mounting and operator assembly as will be hereinafter more fully described. The opposite end of lead screw 52 is rotatably supported in a hollow cylindrically shaped boss 482 of a one-piece bracket casting 484. Bolts 486 passing through apertured flanges 488 cast rigid with boss 482 rigidly secure bracket 484 to the front wall of lathe bed 30 in a position where the axis of boss 482 aligns with the axis of special bracket boss 398, thereby holding lead screw 52 in alignment.

The end of lead screw 52, where it extends beyond boss 482, is threaded and receives a tightening and lock nut assembly 490 to axially hold lead screw in place.

In order to remove shear pin 476 if it becomes sheared or otherwise damaged, carriage 40 is first manually moved towards tail stock 38 by means as will be described and the half nut mounting and operator unit of apron 50 is positioned to supportingly engage lead screw 52 by means that will become apparent as the description proceeds. Bolts 486 of lead screw support bracket 484 are then removed and bracket 484, together with lead screw 52, are shifted to the right as viewed from FIGURE 1. The axial displacement of lead screw 52 exposes shear pin 476 and its receiving bore 478; this enables the easy and rapid replacement of the shear pin 476.

In order to reassemble lead screw 52 with its new shear pin on the lathe, shear pin head 480 is aligned with longitudinal keyway 423 in collar 420. Lead screw 52 is then axially displaced to the left as viewed from FIGURE 1, so that shear pin head 480 is slidably received in keyway 423. Bolts 486 of mounting bracket 484 are thereafter replaced and the lathe is again ready for operation.

By this structure, it will be appreciated that by means of the shearing pin connection of the lead screw 52 permanently installed in coupling collar 420, simple removal of lead screw section 474 containing shear pin 476 is facilitated to permit ready and quick replacement of shear pin 476.

LATHE CARRIAGE APRON STRUCTURE

Referring now to FIGURES 20–23, the apron structure 50 carrying the longitudinal and cross feed drives for powering carriage 40, is shown to comprise a generally rectangularly shaped one-piece apron 500 formed from a single casting. Apron 500 basically consists of a vertical clutch and feed shift mounting wall portion 502 and a vertical half nut and thread indicator mounting wall portion 504 offset in non-overlapping and generally parallel relationship rearwardly of wall portion 502 to provide continuous stepped front and rear wall apron faces for a purpose as will become apparent. Wall portion 504 is integrally united to wall portion 502 by means of a bridging web portion 510 extending perpendicularly between wall portions 502 and 504.

The steps formed in the front and rear faces of apron 500 by rearwardly offsetting wall portion 504 in non-overlapping relationship to wall 502, is irregularly contoured and basically comprises a generally vertical stepped section 512 extending downwardly from the upper edge of apron 500 having a slight curvature at its lower end, a straight vertical section 514 offset to the left of section 512 and extending upwardly from the bottom edge of apron 500, and, as best viewed from FIGURE 20, a horizontally extending stepped section 516 connecting adjacent ends of vertical sections 512 and 514.

Bridging wall 510 is contoured to correspond to the stepped sections 512, 514 and 516 and is provided with a generally L-shaped slot 518 extending downwardly adjacent and midway of the lower portion of stepped section 512, around the corner where vertical section 512 and horizontal section 516 are joined and terminating approximately two-thirds the length along horizontal edge 516. As best shown in FIGURE 23, slot 518 is formed so that the rearward edge thereof, as viewed from FIGURE 23, coincides with the flat front face portion of rearward wall 504 to provide for a substantially straight line passage between the rear face of wall portion 502 and the front face of offset wall portion 504.

The upper edges of walls 502 and 504 are cast integral with suitable horizontal overhanging apertured flange portions 520 and 522 rigidly fixed to carriage saddle 44 by means of mounting screws 524 (FIGURE 1).

An integral vertical wall portion 526 depending from flange 520 and extending rearwardly from the lefthand edge of plate portion 502 as viewed from FIGURE 20 cooperates with bridging wall 510 and plate 502 to form an apron feed gear enclosure 528 (FIGURE 22).

Referring now to FIGURES 1 and 24–28, tool carriage 40 is capable of being driven directly from lead screw 52 by means of a screw threaded half nut mounting and operator assembly 530 comprising a one-piece half nut cam lever 532 having a cylindrical shank portion 534 rotatably mounted in a bore 536 formed in an outwardly projecting boss 537 (FIGURE 20) cast integral with offset apron wall portion 504 and a manipulating handle 538 extending beyond the front face of apron wall 504 for rocking shank portion 534 about its axis in bore 536.

As shown in FIGURE 25, a spring loaded retainer pin 540 mounted in a bore 542 transversely communicating with bore 536 engagingly extends into a circumferential groove 543 formed in cam lever shank 534 so as to axially retain cam lever 532 in apron 500.

Figure 26:
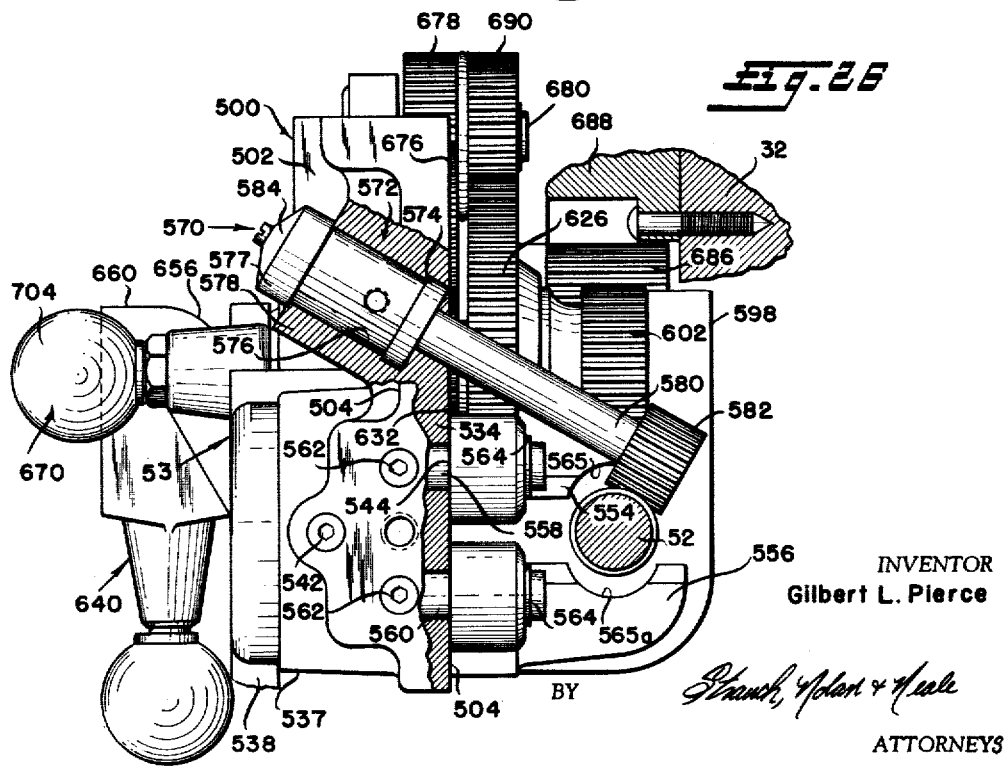
FIGURE 26 is a partially sectioned right-hand side elevational view taken along lines 26—26 of FIGURE 25.

As best shown in FIGURE 27, cam lever shank 534 is provided with an end face 544 having a planar surface normal to the axis of shank 534 and a pair of parallel spaced-apart chordially extending grooves 546 and 548 of equal width and length. Retainer pin 540 axially positions shank 534 so that flat end face 544 is flush with the flat rear face portion of apron wall 504, as best shown in FIGURE 26. Slidably received in grooves 546 and 548, respectively, are pins 550 and 552 extending along axes that are parallel with the rotational axis of lever 532. Pins 550 and 552 are respectively rigidly carried in the same vertical plane by opposed coaxial half nut members 554 and 556 forming a split nut assembly.

As shown in FIGURES 23, 25 and 26, split nut members 554 and 556 are respectively pivotally mounted on pins 558 and 560 fixed in apron mounting plate 504 laterally to the right of bore 536 as by set screws 562 and axially retained thereon between a smooth rear face portion of apron wall 504 and retainer rings 564 seated in circumferential grooves formed in the ends of pins 558 and 560 respectively. Both pins 558 and 560 extending through corresponding ends of half nuts 554 and 556, respectively, are mounted in the same vertical plane and are laterally offset to the right with respect to cam pins 550 and 552, as best shown in FIGURE 23. Half nut members 554 and 556 are positioned on mounting pins 558 and 560, respectively, so that the internally threaded lead screw engaging portions 565 and 565a (FIGURE 26) of nuts 554 and 556, respectively, are pivotal about the axis of pins 558 and 560 in a vertical plane containing feed screw 52. In generally horizontal position, as shown in FIGURE 27, half nuts 554 and 556 are threadedly disengaged from feed screw 52. In this position, chordial grooves 546 and 548 are angularly located approximately 45° between horizontal and vertical planes passing through the center of shank 534 as shown by dotted lines in FIGURE 25. Pin 550 is positioned at the upwardly extending end of groove 546 and pin 552 is positioned at the downwardly extending end of groove 548 so that the vertical distance between pins 550 and 552 is a maximum for normal operation.

By rotating shank 534 in a counterclockwise direction, as viewed from FIGURE 25, by manipulating handle 538, chordial grooves 546 and 548 are rotated toward a horizontal position. Pins 550 and 552 slide along grooves 546 and 538, respectively, as shank 534 is rotated so as to pull pins 550 and 552 vertically closer together. Half nut members 554 and 556 being rigid with pins 550 and 552 are pivoted toward each about their respective pivotal axes so as to threadedly engage around lead screw 52 from the top and bottom.

In order to prevent rotation of half nut members beyond their closed positions around lead screw 52 and to maintain proper directional movement of lever 532, a stop pin 566 (FIGURE 27) is mounted in chordial groove 546 and abuttingly engages pin 550 in fully closed position of half nut member 554.

Thus, by manipulating the simple rugged one-piece operating lever 532 cooperating with camming pins 550 and 552, half-nut members 554 and 556 are capable of being pivotally spread about rearwardly projecting pins 558 and 560 to an open inoperative position around lead screw 52 and pivotally closed to an operative position engaging lead screw 52 so that when lead screw 52 is rotated, carriage 40 together with apron 500 is moved longitudinally lengthwise along lathe bed 30.

In closed position, half nut members 554 and 556 are further operative to support lead screw 52 when it is detached and removed from special mounting bracket 400 which in normal operation supports the left end of lead screw 52 as viewed from FIGURE 1 and as hereinbefore described. By this construction, lead screw 52 is simply and readily axially shifted by longitudinal movement of carriage 40 and supported after it is detached from coupling collar 420 to facilitate the replacement or inspection of shear pin 476.

Apron offset wall portion 504 also mounts an inclined threading indicator 570 above and laterally to the right of cam lever shank 534, as best shown in FIGURE 25. As clearly seen from FIGURES 25, 26 and 28, threading indicator 570 comprises a bushing 572 having a shank portion 574 fixed in a downwardly and rearwardly inclined bore 576 (FIGURE 20) formed in an outwardly projecting upwardly inclined boss 578 cast rigid with apron wall portion 504. Bushing 572 provided with an exposed enlarged head 577 abutting the planar face of boss 578 journals an indicator dial shaft 580 carrying a gear 582 at its lower end and angling downwardly and rearwardly to dispose gear 582 in juxtaposition with lead screw 52 so that gear 582 meshes with lead screw 52 at all times.

Fixed to the end of dial shaft 580 extending upwardly beyond boss 578 and bushing 572 is a thread timing dial 584 which rests on the end face of bushing head 577 and is visible from a position where the lathe is normally operated. Dial 584 displays a reference for engaging half-nut members 554 and 556 for proper longitudinal travel of carriage 40 when the lathe is used to cut screw threads. It will be appreciated that by means of this construction, dial 584 in inclined position is readily and easily readable.

The gearing and clutching mechanisms for moving carriage 40 longitudinally and for actuating cross slide 42 is mounted completely on the apron wall portion 502 and fits into apron enclosure 528 (FIGURE 22).

Figure 28:
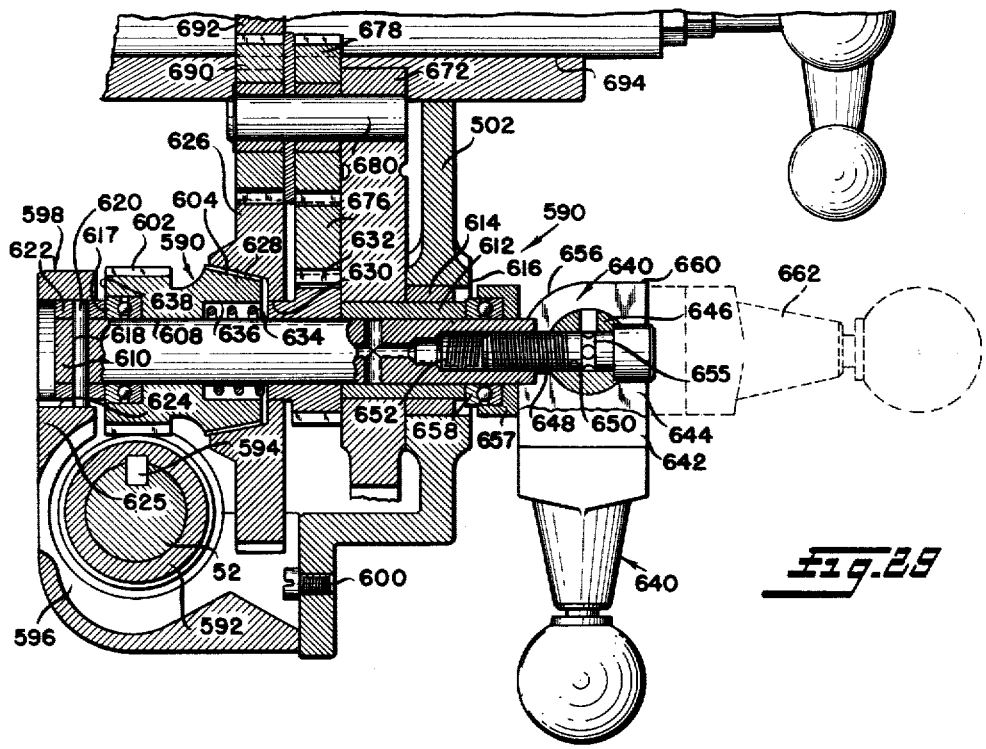
FIGURE 28 is a section along lines 28—28 of FIGURE 24 showing details of the interior of the apron structure.

Thus, with reference now to FIGURES 25, 28 and 29, the longitudinal and cross power feed of apron structure 50 for driving carriage 40 and cross slide 42 includes a clutch mechanism 590 and derives power from lead screw 52 by means of a hollow feed worm segment 592 non-rotatably mounted in surrounding relationship on lead screw 52 as by a key 594. As best shown in FIGURE 24, worm gear segment 592 is cradled in spaced relation between two parallel apertured flange portions 594 and 596 of a generally L-shaped one-piece worm feed bracket 598 rigidly secured to the flat rear face of apron wall portion 502 by means of cap screws 600. Lead screw 52 extends freely through flange portions 594 and 596.

As clearly seen from FIGURE 29, worm gear segment 592 meshes with a brass non-galling worm gear 602 having an elongated hub terminating in a conical friction clutch surface 604 which constitutes the input member of clutch mechanism 590. Gear 602 is provided with a smooth cylindrical stepped bore 608 by which it is freely rotatably mounted on a clutch pin 610 that extends through and is slidably received at one end in a grip sleeve 612 journalled in sleeve bushing 614 of bearing material. Sleeve bushing 614 is fixed in a cylindrical bore boss 616 (FIGURE 20) on apron wall portion 502. At the opposite end, clutch pin 610 carries a thrust bearing 617 received in the enlarge portion of worm gear bore 608 and is provided with a transverse bore 618 which receives a roll pin 620. A clutch collar 622 received on clutch pin 610 is non-rotatably carried by roll pin 620 and is received in a keywayed bore 624 formed in an integral flange portion 625 of worm bracket 598 coaxial with clutch pin 610 and normal to the axis of lead screw 52 for axially sliding non-rotatable movement. Worm bracket bore 624 aligns with boss 616 on apron wall 502.

Mounted adjacent to worm gear 602 is a cross feed drive gear 626 having a conically bored hub to provide a conical surface 628 for matingly engaging drum clutch surface 604 of worm gear 602 to provide a clutch connection between gears 602 and 626. The hub of cross feed drive gear 626 has a counterbored cylindrical bore 630 fixed on the elongated hub of a longitudinal feed drive gear 632 that is freely mounted on clutch pin 610 for rotatable and axial movement.

With continued reference to FIGURE 29, clutch pin 610 externally supports a strong coiled compression spring 634 that is received in a counterbore 636 formed in gear 632 and reacts between worm gear 602 and gear 632 to normally separate clutch surfaces 604 and 628 by urging gear 632 into axial abutment with grip sleeve 612 and worm gear 602 into axial abutment with the planar face 638 of worm bracket 598.

The means for matingly engaging clutch surfaces 604 and 628 comprises a clutch manipulating handle 640 having a bifurcated end portion and the two arms 642 and 644 of the bifurcated portion are supported on a knuckle pin 646 rotatably received in aligned transverse bores formed in arms 642 and 644 and carried by clutch pin 610 by means of an adjusting screw 648 extending through a smooth cylindrical bore 650 transversely formed in knuckle pin 646 between arms 642 and 644 and threadedly engaged in a tapped axial bore 652 formed inwardly of the planar end face of clutch pin 610 extending beyond apron wall 502. Knuckle pin 646 is retained against axial movement on adjusting screw 648 by means of a set screw 653 threadedly received in an axial tapped bore in knuckle pin 646 and communicating with transverse bore 650. Set screw 653 urges a brass plug 654 of smaller diameter into one of a series of radially formed recesses in screw 648 which are formed inwardly of a circumferential groove 655.

The end portions of arms 642 and 644 extending beyond the rotational axis of knuckle pin 646 are identically arcuately cam shaped as shown at 656 and are of such radii that they will bear against the axial face of a bearing cover 657 which abuttingly holds a thrust bearing 658 in axial abutment with grip sleeve 612 on clutch pin 610. Each of the cam surfaces 656 are formed so that the shortest radius of curvature of each cam surface is at the longitudinal center of handle 640 and this portion is preferably flattened slightly as shown at 660 so that when the handle is in substantial alignment with clutch pin 610, this flattened portion of the cam surface will be in contact with bearing cover 657 and will be held firmly against the same by the action of coil spring 634, thus retaining handle 640 in this position until force is applied to rotate the handle about knuckle pin 646.

The radii of the cam surfaces increase in length extending away from the flattened end portion 660 so that when handle 640 is rocked about its axis on knuckle pin 646 to a horizontal position as shown in dotted lines indicated at 662, the cam surface 656 will act on bearing cover 657 to axially displace clutch pin 610 in a forward direction against the bias of spring 634 so as to engage clutch surfaces 604 and 628. By this structure, it will be appreciated that the arcuate cam surfaces are eccentric to the axis of knuckle pin 646 and bear against bearing cover 657 to effect axial displacement of clutch pin 610 as handle 640 is moved between clutch engaging and disengaging positions. By threading adjusting screw 648 into or out of clutch pin 610, the handle 640 is axially displaced with respect to bearing cover 657 so as to vary the clutch engaging pressure.

Thus, by means of this construction, clutch mechanism 590 is quickly and easily operated and ample adjustable pressure may be exerted upon the movable clutch member 602 to secure a positive driving connection which will not slip under heavy loads and, regardless of the amount of frictional contact between the clutch members, they may be quickly and easily released by restoring handle 640 to its vertical clutch disengaging position. Wear on cam surface 656 or bearing cover 657 may be compensated for by the adjustment of screw 648.

As best shown in FIGURES 25, 26, 28 and 29, a feed shift lever 670 is utilized for selectively engaging and disengaging the cross or longitudinal feed drives powering carriage 40. Feed shift lever 670 comprises a one-piece cast plate having a flat plate portion 672 rotatably mounted on grip sleeve 612 between gear 632 and the rear face of apron wall portion 502. A pivot pin 674 (FIGURE 28) nonrotatably carried by shift lever plate 672 extends rearwardly along an axis that is parallel to the axis of clutch pin 610 and rotatably mounts a longitudinal feed idler gear 676 which constantly meshes with longitudinal feed drive gear 632. A second longitudinal feed idler gear 678 constantly meshing with idler gear 676 is rotatably mounted on a pivot pin 680 which extends rearwardly of feed shift lever 670 in parallel relationship to pivot pin 674 and is nonrotatably carried by shift lever plate 672.

Idler gear 678 is engageable and disengageable by rotation of feed shift lever 670 with a longitudinal feed gear 682. Feed gear 682 is rotatably mounted on a pivot pin 684 which is nonrotatably carried by apron wall portion 502 in parallel relationship to clutch pin 610. Fixedly secured to feed gear 682 for rotation therewith and rotatably carried by pivot pin 684 is a rack pinion gear 686 which is in constant meshing engagement with a rack 688 rigidly secured to lathe bed 30.

Thus, by structure, it will be appreciated that a longitudinal feed for driving carriage 40 longitudinally along lathe bed 30 is established between carriage feed screw 52 and rack 688 through clutch 590, longitudinal feed drive gear 632 on the output of clutch 590, idler gears 676 and 678, feed gear 682 and rack pinion gear 686.

The cross feed drive for carriage 40 is established by means of an idler gear 690 mounted on pivot pin 680 in constant mesh with cross feed drive gear 626. Idler gear 690 is engageable and disengageable by rotation of shift lever 670 with a cross feed screw pinion 692 which is rigid with the cross feed screw 694. Thus, by rotation of feed shift lever 670, the cross feed drive is established between carriage feed screw 52 and cross feed screw 694 for driving the cross slide 42 through clutch 590, cross feed drive gear 626, idler gear 690 and cross feed screw pinion 692.

In order to manipulate feed shift lever 670 from an operating position in front of apron 500 the lower end of the flat plate portion 670 extends through slot 518 in apron 500 and overlies apron wall portion 504. A curved cross plate 698 cast perpendicularly rigid with flat plate portion 672 extends forwardly from the lower end of flat plate portion 672 adjacent to bridging wall 510 and terminates in a curved portion that overlaps apron wall portion 502.

As best shown in FIGURE 24, a boss 700 is cast rigid with the portion of cross plate 698 overlying apron wall portion 502 and has a through bore 702. Threadedly mounted in the outer end of bore 702 is a ball handle 704 adapted to be gripped by the operator to manipulate feed shift lever 670. A spring loaded inwardly biased retaining pin 706 mounted in bore 700 engagingly cooperates with a selected one of a group of three detents 708, 710, and 712 (FIGURE 20) formed in an arcuate boss 714 projecting forwardly from apron wall portion 502 adjacent bridging wall 510 so as to rigidly hold feed shift lever 670 in a selected position. Detents 708 and 712 respectively locate the longitudinal and cross feed drives and detent 710 provides a neutral position intermediate the feed positions.

It will now be appreciated that by means of the novel one-piece apron structure hereinbefore described wherein apron wall portion 502 in non-overlapping relationship together with slot 518 formed in bridging wall 510 extending perpendicularly between wall portions 502 and 504, feed shift lever 670 may be formed from a one-piece casting and may be mounted on the rear side of apron 500 while at the same time being manipulatable from the front side of the apron. Feed shift lever 670 thus may be pivoted about an axis coinciding with the axis of clutch pin 610 by simply withdrawing the retaining pin 706 from the detent in which it is positioned and turning the lever until pin 706 is aligned with another of the three detents 708, 710 or 712. The whole sub-assembly of shift lever 670 with idler gears 676, 678 and 690 and retainer pin 706 is pivotable as a unit on the rear side of apron 500 and manipulatable from the front side thereof.

When lever 670 is shifted to its uppermost position where retaining pin 706 aligns with detent 708, cross feed idler gear 690 is disengaged from cross feed screw pinion 692 and idler gear 678 is moved into meshing engagement with feed gear 682 so as to establish the carriage longitudinal feed drive through worm gear 602 longitudinal drive gear 632, idlers 676 and 678, feed gear 682, and rack pinion 686 which meshes with rack 688.

When retainer pin 706 is positioned in the lowermost detent 712 by rotating feed shift lever 670, longitudinal idler gear 678 is disengaged from feed gear 682 and cross feed idler gear 690 is moved into meshing engagement with cross feed screw pinion 692 thus driving cross feed pinion 692 through worm gear 602, cross feed drive gear 626 and idler 690. When retaining pin 704 is positioned in the middle detent 710, both longitudinal feed idler gear 678 and cross feed idler gear 690 are respectively disengaged from feed gear 682 and cross feed screw pinion 692 so that neither the longitudinal feed or the cross feed drive is established.

In order to prevent the half nut members 554 and 556 and the feed shift lever 670 from being positioned in drive engaging positions at the same time, an interlock mechanism 716 is provided for and comprises a lock pin 718 disposed for axial sliding movement in a through radial passage 720 formed in apron boss 537 as best shown in FIGURE 25. Lock pin 718 is rounded at its end protruding beyond the outer periphery of boss 537 and has an annular collar 722 fixed thereto approximately midway of its ends. Lock pin 718 is biased outwardly by means of spring 724 and the collar 722 prevents lock pin 718 from being completely forced out of radial passage 720 by spring 724. A bore 726 radially formed in the shank portion 534 aligns with passage 720 when shank 534 is turned to a position where half nut members 554 and 556 are fully spread.

In this position of cam lever 532, the inner blunt end of lock pin 718 can be forced against the bias of spring 724 into bore 726 to lock cam lever 532 in a position wherein half nut members 554 and 556 are disengaged from feed screw 52.

Approximately midway of the upper and lower edges of cross plate 698 is a notch 730 formed inwardly of cam surface 728. This notch 730 is positioned adjacent to the outer end of lock pin 718 when shift lever 670 is in its neutral position with retaining pin 706 engaging in detent 710 so that lock pin 718 is biased by spring 724 into notch 730. In this position, lock pin 718 is sufficiently axially shifted to the left as viewed from FIGURE 25 so that it is completely free of cam lever bore 726. Thus, it will be appreciated that when lock pin 718 is positioned in notch 730, cam lever 532 is free to be rotated so as to selectively engage and disengage half nut members 554 and 556 with feed screw 52.

Any axial movement of lock pin 718 to the right from its engaging position in notch 730, as viewed from FIGURE 25, causes lock pin 718 to extend beyond radial passage 720 in boss 537 and the inner periphery of bore 536. Thus, in order to axially shift lock pin 718 to the right from its notch engaging position, cam lever bore 726 must be aligned with passage 720 to permit displacement of lock pin 718 beyond the inner periphery of bore 536.

By rotation of feed shift lever 670 from its neutral position, the outer rounded end of lock pin 718 engages cam surface 728 of shift lever cross plate 698 so as to axially shift lock pin 718 to the right beyond the inner periphery of apron bore 536 and radial passage 720. By this structure it will be appreciated that in order to rotate feed shift lever 670 from its neutral position wherein notch 730 is positioned to receive lock pin 718, cam lever 532 must be turned to a position where bore 726 aligns with apron boss passage 720. Thus, to shift lever 670 to either of its feed positions, cam lever 532 must be turned to a position where half-nut elements 554 and 556 are disengaged from feed screw 52. As lock pin 718 is axially shifted into cam lever bore 726 by rotating feed shift lever 670 out of its neutral position and into one of its feed positions, cam lever 532 is thereby locked in a position wherein half-nut members 554 and 556 are fully disengaged from feed screw 52.

When shift lever 670 is rotated to a neutral position, notch 730 allows lock pin 718 to move to the left under the influence of spring 724. This movement releases cam lever 732 so that it may be rotated to engage half-nut members 554 and 556 with feed screw 52. Thus, it will be appreciated that when half-nut members 554 and 556 are engaged with feed screw 52, lock pin 718 prevents the shift lever 670 from being moved or rotated from its neutral position and in order to shift lever 670 to either longitudinal drive position or its cross feed drive position, half-nut members 554 and 556 must first be disengaged from feed screw 52 in order to permit movement of lock pin 718 to the right as viewed from FIGURE 25. Thus, a concomitant engagement of the two longitudinal power feeds is thereby prevented.

The usual handwheel 734 for manual longitudinal feeding of carriage 40 is fixed on a handwheel shaft 736. This shaft 736 is journalled in a bore 736 (FIGURE 20) formed in apron wall portion 502 and projects rearwardly of the rear face of apron 500. Fixedly mounted near the rearward end of handwheel shaft 736 is a handwheel gear 740 which is in constant meshing engagement with longitudinal feed gear 682 so that rack pinion 686 may be rotated by turning handwheel 734 whereby to move carriage 40 longitudinally of lathe bed 30.

The apron handwheel 734 is also utilized to axially shift lead screw 52 when it is desired to replace or inspect shear pin 476. This is accomplished by first engaging half-nut members 554 and 556 with lead screw 52 as hereinbefore described, removing mounting screws 486 of lead screw support bracket 484 and then turning apron handwheel 734 to axially displace feed screw 52 to the right as viewed from FIGURE 1 until shear pin 476 is exposed. After the shear pin is replaced, pin 476 is lined up with keyway 422 in collar 420 and lead screw 52 is axially shifted to the left as viewed from FIGURE 1 by turning apron handwheel 734 until the holes in bracket 484 are lined up with the tap holes in bed 30 so as to permit replacement of screws 486.

From the foregoing apron structure, it will be appreciated that carriage 40 may be longitudinally driven by any one of three separate drives. First, carriage 40 may be driven manually by placing feed shift lever 670 in its neutral position wherein retaining pin 706 is positioned in detent 710, disengaging idler gear 678 from longitudinal feed gear 682. Cam lever 532 is placed so that half-nut members 554 and 556 are spread and disengaged from feed screw 52. Handwheel 734 then can be rotated to manually longitudinally position carriage 40.

Carriage 40 may alternately be longitudinally driven through feed clutch 590. With clutch 590 in disengaged position wherein clutch handle 662 is in a horizontal position, shift lever 670 is rotated in a counterclockwise direction to position retaining pin 706 in the uppermost detent 708. After the shift is completed, clutch handle 662 is moved to its vertical position to drivingly connect the clutch faces 604 and 628 thereby establishing a drive connection between feed screw 52 and rack 688 through worm gear 602 as hereinbefore described to longitudinally drive carriage 40.

The third longitudinal drive for carriage 40 is accomplished by means of a power feed through half-nut members 554 and 556. Feed shift lever is rotated to its neutral position wherein retaining pin 706 is positioned in detent 710 and cam lever 532 is then rotated in a counterclockwise direction as viewed from FIGURE 25 so that half-nut members 554 and 556 engage around feed screw 52 to establish a drive connection with feed screw 52 to thereby longitudinally drive the apron 500 and carriage 40. The interlock mechanism 716 between the longitudinal power feed drive including clutch assembly 590 and the longitudinal power feed through half-nut mounting and operator unit 530 prevents both drives from being concomitantly engaged to longitudinally drive carriage 40 since these drives move carriage 40 at different rates of speed and therefore it is undesirable to allow both drives to be engaged at a given time.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a multi-speed drive for a metal lathe providing correlated spindle, carriage and cross slide drives comprising a power source including a power shaft and drive pulley; a lathe bed having front, side and end walls and conventional longitudinal ways; a spindle drive gear box fixedly mounted at one end of said lathe bed on said longitudinal ways and including a spindle adapted to mount a workpiece for rotation therewith, an output gear driven by said spindle, a driven pulley connected to said spindle and a pulley belt opening in its wall opposite said driven pulley; a tool carriage slidably supported on said longitudinal ways and having carriage feed drive means for selective connection to a feed screw; a feed screw journalled on said lathe bed in longitudinal parallelism to said longitudinal ways; means for selectively drivingly connecting said feed screw and said carriage feed drive means; a tool cross slide slidably supported on said tool carriage and having drive means therefore; means for selectively drivingly connecting said feed screw to said cross slide drive means; a multi-speed selector type gear train including support means mounting it at said one end of said lathe bed adjacent said spindle drive gear box including an output gear drivingly connecting said output spindle shaft to said feed screw to selectively establish one of several available speed ratios between said output spindle shaft and said feed screw; and infinitely variable pulley drive means drivingly interconnecting said power shaft and said spindle drive gear box driven pulley comprising a vari-speed pulley mounting support bracket fixed on said lathe bed and having a pair of laterally spaced pivots mounted thereon with their axes aligned and inclined with respect to the axes of said drive and driven pulleys, a vari-speed pulley and shaft assembly suspended from said pair of spaced pivots and having its vari-speed pulley and shaft axis generally longitudinally related to said axes of said driving and driven pulley and means for swinging said vari-speed pulley and shaft assembly around the inclined axes of said pivots to effect a desired speed change of said variable pulley drive means while maintaining the pulley belts substantially in predetermined planes of travel.

2. In a multi-speed drive for a metal lathe providing correlated spindle, carriage and cross slide drives comprising a power source including a power shaft and drive pulley; a lathe bed having front, side and end walls and conventional longitudinal ways; a spindle drive gear box fixedly mounted at one end of said lathe bed on said longitudinal ways and including a spindle adapted to mount a workpiece for rotation therewith, an output gear driven by said spindle, a driven pulley connected to said spindle and a pulley belt opening in its wall opposite said driven pulley; a tool carriage slidably supported on said longitudinal ways and having carriage feed drive means for selective connection to a feed screw; a feed screw journalled on said lathe bed in longitudinal parallelism to said longitudinal ways; means for selectively drivingly connecting said feed screw and said carriage feed drive means; a tool cross slide slidably supported on said tool carriage and having drive means therefor; means for selectively drivingly connecting said feed screw to said cross slide drive means; a multi-speed selector type gear train including support means mounting it at said one end of said lathe bed adjacent said spindle drive gear box including an output gear drivingly connecting said output spindle shaft to said feed screw to selectively establish one of several available speed ratios between said output spindle shaft and said first screw; and infinitely variable pulley drive means drivingly interconnecting said power shaft and said spindle drive gear box driven pulley comprising a vari-speed pulley mounting support bracket fixed on said lathe bed and having a pair of laterally spaced pivots mounted thereon with their axes aligned and inclined with respect to the axes of said drive and driven pulleys, a vari-speed pulley and shaft assembly suspended from said pair of spaced pivots and having its vari-speed pulley and shaft axis generally longitudinally related to said axes of said driving and driven pulley and means for swinging said vari-speed pulley and shaft assembly around the inclined axes of said pivots to effect a desired speed change of said variable pulley drive means while maintaining the pulley belts substantially in predetermined planes of travel, said means for swinging said pulley including a swing frame pivotally suspended from said pivots and mounting said vari-speed pulley and shaft assembly about an axis that is laterally spaced from the axes of said pivots, an elongated threaded adjusting shaft transversely of the axis of said vari-speed pulley and shaft assembly, means for pivotally journalling said adjusting shaft near the front wall of said lathe bed, means near the rear wall of said lathe bed providing an axial threaded connection between said adjusting shaft and said swing frame at a point spaced laterally apart from the axes of said pivots such that said adjusting shaft is threadable axially in and out of said swing frame, and means manipulatable by the lathe operator from an operating position in front of said lathe bed for rotating said adjusting shaft.

3. In a variable speed V-belt transmission having driving and driven pulleys rotatably mounted about spaced apart axes; a variable speed pulley and shaft assembly having an input side and an output side; means including belts engaging said driving and driven pulleys respectively with said input side and said output side; a fixedly mounted support bracket for supporting said pulley and shaft assembly and having spaced apart aligned pivots swingably suspending said pulley and shaft assembly about an axis that is laterally inclined with respect to the axes of said driving and driven pulleys; to vary the transmission speed and means including an inherently resilient pivotally journalled threaded adjusting shaft having an axial threaded connection with said pulley and shaft assembly extending transversely of the swing axis of said pulley and shaft assembly and being operable to rotate said pulley and shaft assembly in a laterally arcing path about said swing axis such that said adjusting shaft is bent laterally with respect to its own axis to frictionally bind its threaded connection with said variable speed pulley assembly and thereby automatically lock said variable speed pulley and shaft assembly in a selected adjusted position.

4. The variable speed V-belt transmission as defined in claim 3 wherein the pivotal journalling of said adjusting shaft is effected by means of a sleeve-like journal hanger pivotally suspended from coaxially mounted pivot pins about an axis extending parallel to the rotational axes of said driving and driven pulleys and axially fixed with respect to said adjusting shaft.

5. In a variable speed V-belt transmission, a fixedly mounted support bracket; a variable speed pulley assembly; support means on which said support assembly is journalled and which is swingably suspended from said support bracket about an axis that is laterally inclined with respect to the rotational axis of said pulley assembly; and means for swinging said pulley assembly in a laterally arcing path about said swing axis including an inherently resilient threaded adjusting shaft rotatably mounted about an axis that is laterally inclined with respect to said swing axis and having an axial threaded connection with said support means that extends normally of the rotational axis of said pulley assembly when said pulley assembly is in vertical suspended position, said adjusting shaft being operable upon rotation to be axially threaded in and out of said support means.

6. In a variable speed V-belt transmission having driving and driven pulleys rotatably mounted about substantially parallel horizontally spaced apart axes; a variable speed pulley assembly having an input side and an output side; means including V-belts engaging said driving pulley with said input side and said output side with said driven pulley; support means on which said pulley assembly is rotatably mounted about an axis that is generally parallel to the axes of said driving and driven pulleys and which is pivotally mounted for swinging movement so as to impart concomitant axial and lateral displacement to said pulley assembly to thereby vary the speed of said driven pulley with respect to that of said driving pulley within a predetermined range and means for selectively imparting swinging movement to said support means comprising: an elongated inherently resilient threaded adjusting shaft; bearing means rotatably mounting said adjusting shaft about an axis extending substantially horizontally normally of the rotational axes of said driving and driven pulleys, said adjusting shaft having an axial supporting threaded connection with said support means remote from said bearing means such that said adjusting shaft is operable to be axially threadable in and out of said support means to pivot said support means and thereby swing said pulley assembly, said threaded connection being disposed for concomitant lateral and axial movement together with said pulley assembly thereby laterally bending said adjusting shaft with respect to its own axis to frictionally bind said threaded connection between said adjusting shaft and said support means whereby said pulley assembly is automatically locked in adjusted position.

7. In an infinitely variable speed drive train, a variable speed pulley assembly; support means on which said pulley assembly is horizontally journalled and which is pivotally mounted about a substantially horizontal axis so as to suspend said pulley assembly for lateral swinging movement with respect to the rotational axis thereof; means including a manipulatable threaded rotatably mounted adjusting shaft extending laterally of the rotational axis of said pulley assembly and having an axially threaded connection with said support means so as to be threadable axially in and out of said support means to thereby swing said support means together with said pulley assembly in a laterally arcing path with respect to the rotational axis of said pulley assembly; and means remote from said threaded connection pivotally mounting said adjusting shaft about an axis that is horizontally normal to the rotational axis of said adjusting shaft to enable said adjusting shaft to swing around its pivotal axis as said support means swings about its axis.

8. In a variable speed V-belt transmission including driving and driven pulleys rotatably mounted about spaced apart axes, a variable speed pulley assembly extending between said driving and driven pulleys and including a pair of coaxially mounted pulley members having belt engaging faces spaced apart in fixed relation to each other and an axially movable belt engaging member coaxially positioned and movable between the fixed belt engaging faces of said pulley members; belts cooperating with said driving and driven pulleys and with respective fixed belt engaging faces of said pulley members, said belts respectively engaging opposed faces of said movable belt engaging member; and means mounting said pulley assembly for imparting concomitant axial and lateral movement to said pulley assembly to vary the transmission speed such that substantially proper alignment of said belts and axial positioning of said pulley assembly is maintained throughout the range of displacement of said pulley assembly comprising; a rigidly mounted support bracket carrying a pair of opposed spaced apart pivot pins having aligned axes laterally inclined relative to the rotational axes of said driving and driven pulleys; a swing frame on which said pulley assembly is rotatably mounted and which is pivotally suspended from said pivot pins for swinging movement about said laterally inclined axis so that said pulley assembly is swingable about said laterally inclined axis in a laterally arcing path with respect to its axis of rotation.

9. In a variable speed V-belt drive transmission for a machine tool having a support bed; a power source including a rotatably mounted driving pulley; a spindle and a spindle drive pulley drive connectable to said spindle; a jack shaft mounted along an axis parallel to the rotational axis of said driving pulley and rotatably carrying a multiple groove pulley means including belts drivingly interconnecting said multiple groove pulley with said spindle drive pulley; and infinitely variable speed drive train means interconnecting said driving pulley with said multiple groove pulley comprising: a support bracket fixedly mounted on said support bed and having spaced apart parallel arms laterally inclined to the rotational axis of said driving pulley; opposed coaxial spaced apart pivot pins carried by said arms on an axis normal to said arms; a swing frame pivotally suspended from said pivot pins for swinging movement about the axis formed by said pivot pins and having a swing shaft laterally spaced apart from said swing axis; a variable speed pulley assembly rotatably mounted on said swing shaft having an input side and an output side; V-belts engaging said driving pulley with said input side and said multiple groove pulley with said output side; and means manipulatably by the machine tool operator for imparting swinging movement to said pulley assembly about said swing axis.

10. The multiple speed drive as defined in claim 9 wherein means are provided for adjusting the tension of said belt engaging the output side of said pulley assembly with said multiple groove pulley comprising: a jack lever extending transversely of said jack shaft and supportingly carrying said jack shaft; a pivot shaft rigidly supported by said support bracket along an axis in spaced apart parallel relationship to said jack shaft, said jack lever being rotatably carried by said pivot shaft and having an ear forming a surface facing said support bracket and substantially normal to the axis of said jack shaft; a screw threadedly received through said support bracket so as to be threadable in and out of said support bracket for abutting engagement with said surface whereby threaded adjustment of said screw causes rotation of said jack lever about said pivot shaft to thereby increase and decrease the tension of said belt engaging the output of said pulley assembly with said multiple groove pulley.

11. In a variable speed the belt transmission having driving and driven pulleys rotatably mounted about substantially parallel horizontally spaced apart axes; a variable speed pulley assembly having an input side and an output side, means including V-belts engaging said driving pulley with said input side and said output side with the said driven pulley; and means mounting said pulley assembly for concomitant axial and lateral displacement to thereby vary the speed of said driven pulley with respect to that of said driving pulley within a predetermined range comprising: a fixedly mounted support bracket; support means pivotally suspended from said support bracket about a horizontal swing axis that is laterally inclined with respect to the axes of said driving and driven pulleys and rotatably carrying said variable speed pulley assembly about an axis that is spaced laterally apart from said swing axis such that said pulley assembly is laterally swingable in a path that is angularly offset relative to the axes of said driving and said driven pulleys and is parallel to the axes of said driving and driven pulleys when in vertically suspended position; and means for selectively imparting swinging movement to said support means including an elongated manipulatable threaded adjusting shaft having a supporting axial threaded connection with said support means that is normal to the rotational axis of said pulley assembly when said pulley assembly is in vertically suspended position; pivotal bearing means spaced axially apart from said threaded connection along the axis of said adjusting shaft and rotatably mounting said adjusting shaft about an axis that is substantially normal to the axes of said driving and driven pulleys so that said adjusting shaft is threadable axially in and out of said support means upon rotation thereof to swing said support means about its pivotal axis and thereby swing said pulley assembly in said laterally arcing path, said adjusting shaft being inherently resilient so that said adjusting shaft is bent laterally with respect to its own axes by swing movement of said support means to frictionally bind said axial threaded connection between said adjusting shaft and said support means and thereby automatically lock said variable speed pulley assembly in its selected adjusted position.

12. The variable speed V-belt transmission as defined in claim 11 wherein the threaded connection between said support means and said adjusting shaft is effected through a cylindrical laterally apertured nut element mounted at its opposite ends in said support means.

13. In a machine tool having a support frame, a drive motor, a spindle and a spindle drive member coaxial with said spindle and drive connectable thereto; a multiple stage V-belt variable speed drive train interconnecting said drive motor and said drive member comprising a drive pulley driven by said motor, a variable speed pulley shaft assembly having an input side and an output side; means including V-belts engaging said drive pulley with said input side and said output side with said spindle drive member; a fixedly mounted support bracket and means on said support bracket swingably suspending said pulley and shaft assembly about a swing axis that is laterally inclined with respect to the axis of said drive pulley such that said pulley and shaft is swingable in a laterally arcing path that is angularly offset relative to the axis of said drive pulley; means manipulatable by the machine operator including an adjusting shaft rotatably mounted on said suport frame and threaded with a first selected pitch for threaded engagement with said pulley and shaft assembly so as to be threadable axially in and out of said pulley and shaft assembly, and handwheel means manipulatable by the machine operator from an operating position in front of said frame for rotating said adjusting shaft to thereby thread said adjusting shaft in and out of said swing frame and thereby selectively positioning said pulley assembly along said arcing path to provide an infinite speed adjustment of said spindle within a predetermined range; and means approximately adjacent to said handwheel means for indicating the adjusted speed of said spindle including means defining a second series of threads on said adjusting shaft of lesser pitch diameter than said first series of threads, a nut element mounted to threadedly engage said second series of threads so that said adjusting shaft is threaded in and out of said nut element to axially displace said nut element with respect to the rotational axis of said adjusting shaft, an indicating member rigid with said nut element, a visually accessible dial mounted approximately adjacent to said handwheel means and having selected integers cooperating with said indicating member to indicate the selected speed of said spindle.

14. The machine tool as defined in claim 13 wherein support means fixed to said frame are provided for mounting said adjusting shaft and includes a hollow bracket through which said adjusting shaft extends, said bracket having an upwardly facing portion for mounting said dial and a slot extending longitudinally with said adjusting shaft, said indicating member extending through said slot and cooperating with the sides thereof so as to be restrained from turning when said adjusting shaft is rotated.

References Cited in the file of this patent
UNITED STATES PATENTS

| | | |
|---|---|---|
| 2,149,014 | Fritzsch | Feb. 28, 1939 |
| 2,214,996 | Groene | Sept. 17, 1940 |
| 2,381,422 | Bickel | Aug. 7, 1945 |
| 2,399,045 | Kylin | Apr. 23, 1946 |
| 2,546,687 | Brandenburg | Mar. 27, 1951 |
| 2,558,275 | Siekmann | June 26, 1951 |
| 2,695,529 | Evans | Nov. 30, 1954 |
| 2,755,676 | Jepson | July 24, 1956 |
| 2,885,897 | Petigrew | May 12, 1959 |

UNITED STATES PATENT OFFICE
CERTIFICATE OF CORRECTION

Patent No. 3,106,116            October 8, 1963

Gilbert L. Pierce

It is hereby certified that error appears in the above numbered patent requiring correction and that the said Letters Patent should read as corrected below.

Column 1, line 34, for "spinder" read -- spider --; column 2, line 9, for "stop" read -- step --; column 22, line 51, for "538" read -- 548 --; column 29, line 15, for "first" read -- feed --.

Signed and sealed this 14th day of April 1964.

(SEAL)
Attest:
ERNEST W. SWIDER            EDWARD J. BRENNER

Attesting Officer            Commissioner of Patents